United States Patent
Dunjic et al.

(10) Patent No.: US 12,323,535 B2
(45) Date of Patent: *Jun. 3, 2025

(54) DYNAMIC MANAGEMENT AND IMPLEMENTATION OF CONSENT AND PERMISSIONING PROTOCOLS USING CONTAINER-BASED APPLICATIONS

(71) Applicant: The Toronto-Dominion Bank, Toronto (CA)

(72) Inventors: Milos Dunjic, Oakville (CA); Arthur Carroll Chow, Markham (CA); David Samuel Tax, Toronto (CA); Armon Rouhani, Toronto (CA); Keith Sanjay Ajmani, Toronto (CA); Gregory Albert Kliewer, Barrie (CA); Anthony Haituyen Nguyen, Toronto (CA); Martin Albert Lozon, London (CA); Kareem El-Onsi, Toronto (CA); Ashkan Alavi-Harati, Markham (CA); Arun Victor Jagga, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 21 days.

This patent is subject to a terminal disclaimer.

(21) Appl. No.: 18/196,230

(22) Filed: May 11, 2023

(65) Prior Publication Data
US 2023/0291571 A1    Sep. 14, 2023

Related U.S. Application Data

(63) Continuation of application No. 16/431,090, filed on Jun. 4, 2019, now Pat. No. 11,689,370.

(51) Int. Cl.
*H04L 9/32* (2006.01)
*H04L 9/08* (2006.01)
*H04L 9/30* (2006.01)

(52) U.S. Cl.
CPC .............. *H04L 9/3247* (2013.01); *H04L 9/30* (2013.01); *H04L 9/3213* (2013.01)

(58) Field of Classification Search
CPC . H04L 67/00; H04L 41/00; H04L 9/30; H04L 9/3247; H04L 63/10; H04L 9/3213;
(Continued)

(56) References Cited

U.S. PATENT DOCUMENTS 5,619,671 A    4/1997   Bryant et al.
9,225,511 B1   12/2015  Wharton et al.
(Continued)

FOREIGN PATENT DOCUMENTS

WO    WO 2007080588 A1    7/2007

*Primary Examiner* — Mohammad A Siddiqi
(74) *Attorney, Agent, or Firm* — NIXON PEABODY LLP

(57) ABSTRACT

The disclosed exemplary embodiments include computer-implemented systems, devices, apparatuses, and processes that dynamically implement and manage consent and permissioning protocols using container-based applications. By way of example, a device may receive, through a programmatic interface, a first request for an element of data generated by an executed application program. When the first request is consistent with consent data associated the executed application program, the device may obtain the requested data element and a digital signature applied to the requested data element by a computing system. Based on a verification of the applied digital signature, the device may generate and present a representation of the requested data element within a digital interface, along with an interface element that confirms the verification of the digital signature.

19 Claims, 12 Drawing Sheets

(58) Field of Classification Search
CPC ..... H04L 63/12; H04L 2209/56; G06F 21/53; G06F 3/00
See application file for complete search history.

(56) References Cited

U.S. PATENT DOCUMENTS

| | | | |
|---|---|---|---|
| 10,733,685 B1 | 8/2020 | Gailloux et al. | |
| 10,749,677 B2 | 8/2020 | Agrawal et al. | |
| 11,689,370 B2 * | 6/2023 | Dunjic | H04L 9/3213 713/159 |
| 2004/0054908 A1 | 3/2004 | Circenis et al. | |
| 2006/0077904 A1 * | 4/2006 | Brandenburg | H04L 47/28 370/252 |
| 2009/0037994 A1 * | 2/2009 | Buss | H04L 63/0807 726/9 |
| 2012/0240211 A1 | 9/2012 | Counterman et al. | |
| 2013/0055347 A1 | 2/2013 | Chawla et al. | |
| 2013/0086645 A1 | 4/2013 | Srinivasan et al. | |
| 2013/0173642 A1 | 7/2013 | Oliver | |
| 2016/0096508 A1 * | 4/2016 | Oz | H04L 67/125 701/36 |
| 2016/0132214 A1 * | 5/2016 | Koushik | G06F 8/61 715/741 |
| 2016/0134596 A1 | 5/2016 | Kovacs et al. | |
| 2017/0085438 A1 | 3/2017 | Link et al. | |
| 2017/0223005 A1 * | 8/2017 | Birgisson | H04L 63/083 |
| 2017/0330145 A1 * | 11/2017 | Studnicka | G07C 9/00896 |
| 2018/0068130 A1 | 3/2018 | Chan et al. | |
| 2018/0083971 A1 | 3/2018 | Brown et al. | |
| 2018/0109532 A1 | 4/2018 | Cairns et al. | |
| 2018/0115551 A1 | 4/2018 | Cole | |
| 2018/0295126 A1 * | 10/2018 | Gilpin | H04L 63/0853 |
| 2018/0359238 A1 * | 12/2018 | Appiah | H04L 63/0853 |
| 2019/0188704 A1 | 6/2019 | Grendon et al. | |
| 2019/0380020 A1 * | 12/2019 | Pellegrini | H04W 4/90 |
| 2020/0027067 A1 | 1/2020 | Hertzog et al. | |

* cited by examiner

DYNAMIC MANAGEMENT AND IMPLEMENTATION OF CONSENT AND PERMISSIONING PROTOCOLS USING CONTAINER-BASED APPLICATIONS

CROSS-REFERENCE TO RELATED APPLICATION

This application is a continuation of, and claims the benefit of priority to, U.S. application Ser. No. 16/431,090, filed Jun. 4, 2019, the disclosure of which is expressly incorporated herein by reference to its entirety.

TECHNICAL FIELD

The disclosed embodiments generally relate to computer-implemented systems and processes that dynamically manage and implement consent and permissioning protocols using container-based applications.

BACKGROUND

Many computing environments include multiple, network-connected devices and systems that maintain, access, or distribute confidential data across various communications networks. For example, in an open banking environment, these computing systems may maintain programmatic interfaces capable of establishing communications, and exchanging data, with one or more third-party applications executed by additional network-connected devices and systems. For example, a third-party application, such as an executable financial management application, may access elements of confidential customer and account data maintained on behalf of a customer by computing systems of one or more financial institutions, and may perform operations to process, aggregate, or display portions of the obtained customer and account data on a digital interface, e.g., via the customer's mobile device

SUMMARY

In some examples, a device may include a display unit, a communications interface, a memory storing instructions, and at least one processor coupled to the display unit, to the communications interface, and to the memory. The at least one processor may be configured to execute the instructions to receive a first request for an element of data. The first request may be generated by an application program executed by the at least one processor, and the first request may be received from the executed application program through a programmatic interface. When the first request is consistent with consent data associated the executed application program, the at least one processor may be configured to obtain the requested data element and a digital signature applied to the requested data element by a computing system. Based on a verification of the applied digital signature, the at least one processor may be configured to generate and present, via the display unit, a representation of the requested data element within a digital interface. The digital interface may include an interface element that confirms the verification of the digital signature.

In other examples, a computer-implemented method may include receiving, using at least one processor, a first request for an element of data. The first request may be generated by an application program executed by the at least one processor, and the first request may be received from the executed application program through a programmatic interface. When the first request is consistent with consent data associated the executed application program, the computer-implemented method includes obtaining, using the at least one processor, the requested data element and a digital signature applied to the requested data element by a computing system. Based on a verification of the applied digital signature, the computer-implemented method includes, using the at least one processor, generating and presenting a representation of the requested data element within a digital interface, the digital interface comprising an interface element that confirms the verification of the digital signature.

Additionally, in some examples, a tangible, non-transitory computer-readable medium stores instructions that, when executed by at least one processor, cause the at least one processor to perform a method that includes receiving a first request for an element of data. The first request may be generated by an application program executed by the at least one processor, and the first request may be received from the executed application program through a programmatic interface. When the first request is consistent with consent data associated the executed application program, the method includes obtaining the requested data element and a digital signature applied to the requested data element by a computing system. Based on a verification of the applied digital signature, the method includes generating and presenting a representation of the requested data element within a digital interface, the digital interface comprising an interface element that confirms the verification of the digital signature.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
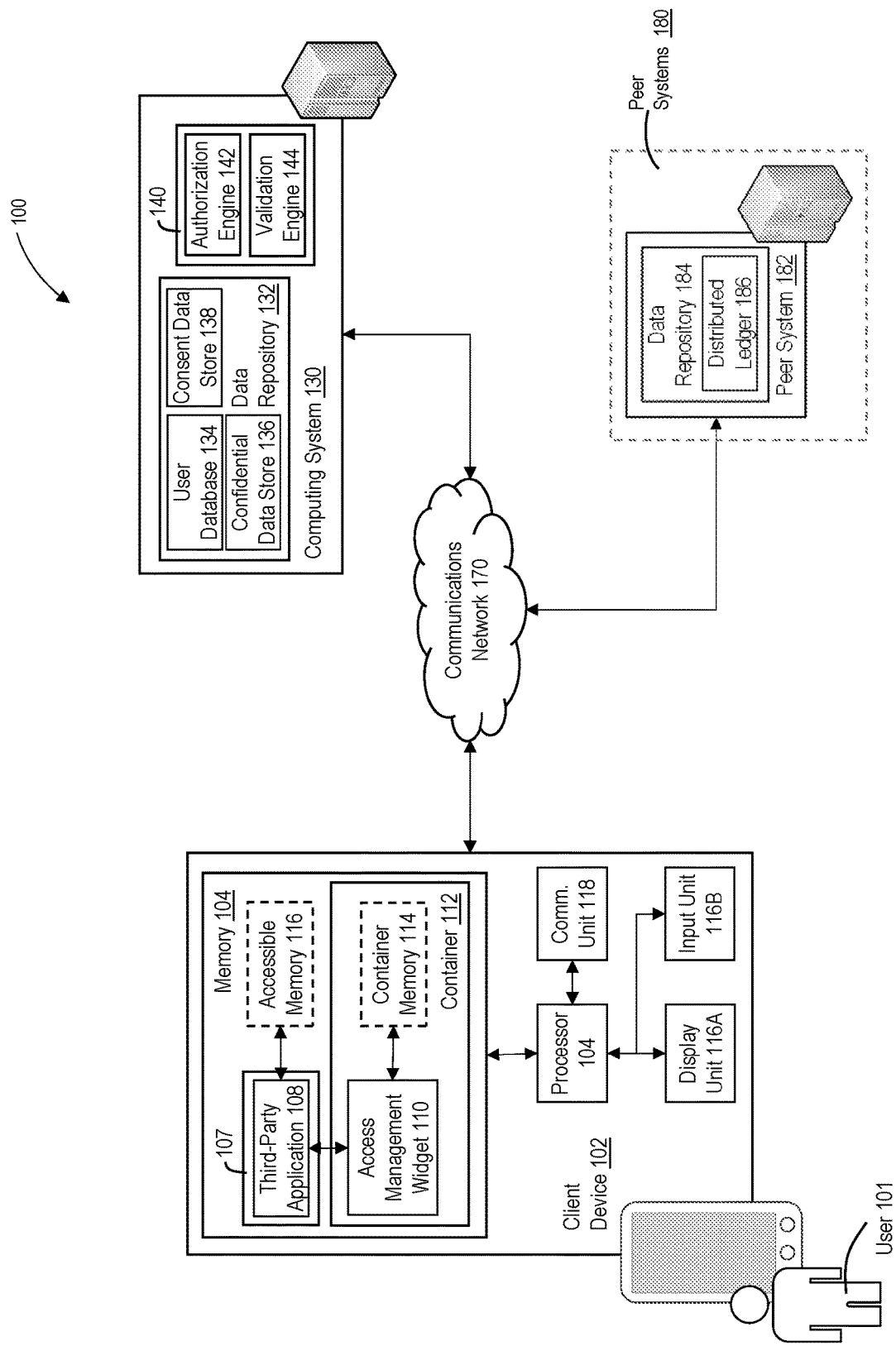
FIG. 1 is a block diagram of an exemplary computing environment, in accordance with some embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 illustrates components of an exemplary computing environment 100, in accordance with some exemplary embodiments. As illustrated in FIG. 1, environment 100 may include one or more computing devices, such as client device 102 operated by a user 101, and one or more computing systems, such as computing system 130. Environment 100 may also include one or more peer systems 180, such as, but not limited to, peer system 182. In some instances, each of client device 102, computing system 130, and peer systems 180, including peer system 182, may be interconnected across one or more wired or wireless communications networks, such as communications network 170. Examples of network 170 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories that store data and/or software instructions, such as memory 104, and one or more processors, such as processor 106, configured to execute the software instructions. As described herein, client device 102 may be associated with or operated by a corresponding user, such as user 101, and examples of client device 102 include, but are not limited to, as a smart phone, tablet computer, a desktop computer, a gaming console, a wearable device, or another computing device, system, or apparatus associated with user 101.

In some instances, the one or more tangible, non-transitory memories may store application programs, application modules, and other elements of code executable by the one or more processors. For example, as illustrated in FIG. 1, client device 102 may maintain, within memory 104, an application repository 107 that includes an executable third-party application 108, which may be developed by an provisioned to client device 102 by one or more computing systems operated by, or associated with, a third-party entity. Examples of third-party application 108 include, but are not limited to, a financial management application, an third-party financial aggregator application, and another application that, when executed by processor 106, requests elements of confidential data maintained on behalf of user 101 by one or more computing systems operating within environment 100, such as computing system 130, and processes, aggregates, or displays portions of the requested elements of the confidential data within a corresponding digital interface.

Client device 102 may also maintain, within local memory 104, one or more container-based applications, such as access management widget 110. Access management widget 110 may be developed by computing system 130, which maintains elements of confidential data on behalf of user 101, and in some examples, may be deployed to client device 102 in a container format (shown generally as application container 112 in FIG. 1) that encapsulates access management widget 110 and one or more dependencies associated with an operating system executed by client device 102, such as runtime resources, system tools, system libraries, or settings. In some instances, when deployed to client device 102, application container 112 may virtualize processing, memory, storage, and network resources of client device 102 at an operating-system level, which may enable access management widget 110 (when executed by processor 106) to perform operations on portions of local memory 104 that are isolated from and inaccessible to other executed applications, such as third-party application 108.

As illustrated in FIG. 1, application container 112 may virtualize a portion of local memory 104, e.g., container memory 114, that is accessible to executed access management widget 110. In some instances, container memory 114 may be inaccessible to one or more additional application programs executed by processor, e.g., third-party application 108, and may be isolated from one or more additional portions of local memory 104 that are accessible to these additional application programs, e.g., accessible memory 116 of FIG. 1.

By way of example, when executed by processor 106 (e.g., in response to on one or more commands programmatically generated by third-party application 108), executed access management widget 110 may perform operations that initiate one or more token-based authentication and consent processes with computing system 130, such as an OAuth protocol, and that securely access confidential data maintained by computing system 130, in accordance with an outcome of these one or more token-based authentication and consent processes. In some instances, illustrated in FIG. 1, executed third-party application 108 may interact and exchange data with executed access management widget 110, which may establish a secure communication with a programmatic interface maintained by computing system 130 and may access elements of confidential data maintained on behalf of user 101 by computing system 130 in accordance with a type or level of access granted to third-party application 108 by user 101. In other instances, not illustrated in FIG. 1, environment 100 may also include additional computing systems that maintain confidential data on behalf of user 101 and other users, and one or more of these additional computing systems may deploy a corresponding, contained-based access management module to client device 102, which when executed, may manage access to the confidential data maintained by corresponding ones of these additional computing systems.

Client device 102 may include a display unit 116A configured to present interface elements to user 101, and an input unit 116B configured to receive input from a user of client device 102, such as user 101. Display unit 116A may include, but is not limited to, an LCD display unit or other appropriate type of display unit, and input unit 116B may include, but is not limited to, a keypad, keyboard, touchscreen, fingerprint scanner, voice activated control technologies, stylus, or any other appropriate type of input unit. Further, in some examples, the functionalities of display unit 116A and input unit 116B may be combined into a single device, such as a pressure-sensitive touchscreen display unit that can present elements (e.g., a graphical user interface) and can detect an input from user 101 via a physical touch. Client device 102 may also include a communications interface 118, such as a transceiver device, coupled to processor 106 and configured to establish and maintain communications with communications network 170 via one or more appropriate communications protocols.

Referring back to FIG. 1, each of computing system 130 and peer systems 180 (including peer system 182) may represent a computing system that includes one or more servers and one or more tangible, non-transitory memory devices storing executable code and application modules. The one or more servers may each include one or more processors, which may be configured to execute portions of the stored code or application modules to perform operations consistent with the disclosed embodiments. Further, in some examples, each of computing system 130 and peer systems 180 (including peer system 182) may include a communications unit or interface coupled to the one or more processors for accommodating wired or wireless communication across network 170 with any of the additional network-connected systems or devices described herein, e.g., a transceiver device.

In some instances, each of computing system 130 and peer systems 180 (including peer system 182) may correspond to a discrete computing system, as described herein. In other instances, one or more of computing system 130 and peer systems 180 correspond to a distributed system that includes computing components distributed across one or more networks, such as communications network 170, or other networks, such as those provided or maintained by cloud-service providers (e.g., Google Cloud™, Microsoft Azure™, etc.). The disclosed embodiments are, however, not limited to these exemplary distributed systems and, in other instances, computing system 130 and peer systems 180 (including peer system 182) may include computing components disposed within any additional or alternate number or type of computing systems or across any appropriate network.

In some instances, computing system 130 may maintain elements of confidential data within the one or more tangible, non-transitory memories, e.g., confidential data maintained on behalf of user 101. For example, computing system 130 may be associated with, or may be operated by, a financial institution that provides financial services to user 101 and other customers, and the confidential data may include, among other things, confidential profile data that characterizes user 101, account data identifying and characterizing one or more financial services accounts or payment instruments held by user 101, or transaction data identifying and characterizing one or more transactions involving the financial services accounts or payment instruments.

In some instances, computing system 130 may perform any of the exemplary processes described herein to provision, to executed access management widget 110 across a secure, programmatic interface, one or more elements of confidential data requested by executed third-party application 108 in accordance with a type or level of consent previously granted by user 101 (e.g., through the exemplary token-based authentication and consent processes described herein), To facilitate a performance of these and other exemplary processes, such as those described herein, computing system 130 may maintain, within one or more tangible, non-transitory memories, a data repository 132 that includes a user database 134, a confidential data store 136, and a consent data store 138.

For example, user database 134 may include data records that identify and characterize one or more users of computing system 130, e.g., user 101. For example, and for each of the users, the data records of user database 134 may include a corresponding user identifier (e.g., an alphanumeric login credential assigned to user 101 by computing system 130), and data that uniquely identifies one or more devices (such as client device 102) associated with or operated by that user (e.g., a unique device identifier, such as an IP address, a MAC address, a mobile telephone number, etc., that identifies client device 102).

Confidential data store 136 may maintain elements of confidential user data on behalf of user 101 and other users of computing system 130. For example, confidential data store 136 may include confidential account data and confidential transaction data that identify and characterize a balance or transaction history of one or more payment instruments, deposit accounts, brokerage accounts, or other financial services accounts issued to user 101 (e.g., by the financial institution that operates computing system 130). Further, and by way of example, one or more data records of confidential data store 136 may also include profile data that identifies and characterizes user 101, such as, but not limited to, a name or an address of user 101, one or more governmental identifiers of user 101 (e.g., a driver's license number, a social security number, etc.), and demographic data that characterizes user 101 (e.g., an age, a gender, an income level, etc.). In some instances, each of the data records of confidential data store 136 may also include a corresponding user identifier (e.g., an alphanumeric login credential assigned to user 101 by computing system 130) and/or a corresponding device identifier (e.g., the IP address, MAC address, or mobile telephone number of client device 102), and as such, each of the data records confidential data store 136 may also be linked to, and associated with, one or more corresponding data records within user database 134.

Consent data store 138 may maintain, for one or more third-party applications, such as third-party application 108, information indicative of a successful outcome of one or more token-based authentication and consent processes, e.g., an OAuth protocol, implemented by computing system 130 and access management widget 110 executed by client device 102. By way of example, consent data store 138 may maintain a digital token, cryptogram, hash value, or other element of cryptographic data, e.g., an OAuth token, indicative of not only a successful authentication of user 101 by computing system 130, but also of a type or level of access to confidential data granted by user 101. Further, in some instances, each of the digital tokens, cryptograms, hash values, or other elements of cryptographic data, e.g., that OAuth token, may be linked to and associated with a corresponding consent document that identifies the user 101 and third-party application 108, and that characterizes the type or level of access granted to executed third-party application 108 by user 101, e.g., through any of the exemplary token-based authentication and consent processes described herein.

By way of example, the consent document may reflect a selective grant by user 101, to executed third-party application 108, or to executed access management widget 110 acting on behalf of third-party application 108, of access to specific types or classes of confidential data maintained within confidential data store 136, such as, but not limited to, profile data, account data, or transaction data maintained on behalf of user 101 by computing system 130. Additionally, or alternatively, the consent document may also reflect a selective grant, to executed third-party application 108, or to executed access management widget 110 acting on behalf of third-party application 108, of access to particular data elements within the specific types or classes of confidential data (e.g., transaction dates and amounts, but not merchant names or purchased products; customer name and address, but not governmental identifiers; account identifiers, but not account balances, etc.), or to access processed or aggregated elements of the confidential data (e.g., as processed or aggregated by executed access management widget 110), but not raw elements of confidential data.

Further, in some instances, the consent document may also identify a permission granted by user 101 to third-party application 108, or to access management widget 110 acting on behalf of third-party application 108, to further process one or more the accessed elements (or types or classes of elements) of confidential data, to locally maintain one or more of the accessed elements (or types or classes of elements) of confidential data, or to further distribute one or more accessed elements (or types or classes of elements) of confidential data to additional related or unrelated computing systems or to application programs executed by these additional or unrelated systems (e.g., fourth- and fifth-party applications, etc.). As described herein, the consent document consent document may be formatted in JavaScript Object Notation (JSON) format or another language-independent, data interchange format.

Referring back to FIG. 1, computing system 130 may also maintain, within the one or more tangible, non-transitory memories, one or more executable application programs 140, such as, but not limited to an authorization engine 142 and a validation engine 144. When executed by the one or more processors of computing system 130, authorization engine 152 can perform operations that, in conjunction with access management widget 110 executed at client device 102, implement one or more of the exemplary token-based authorization and consent protocols described herein (e.g., an OAuth protocol), that generate a digital token, cryptogram, hash value, or other element of cryptographic data (e.g., an OAuth token), indicative of not only a successful authentication of user 101 by computing system 130, and further, that: (i) generate a digital token, cryptogram, hash value, or other element of cryptographic data indicative of a successful authentication of user 101 by computing system 130; and (ii) generate the consent document indicative of a type or level of access to confidential data granted by user 101. In some instances, executed authorization engine 142 may cause computing system 130 to transmit the OAuth token and the consent document across network 170 to executed access management widget 110, e.g., for storage within container memory 114.

Further, when executed by the one or more processors of computing system 130, validation engine 144 may perform any of the exemplary processes described herein to parse a request for access to one or more elements of confidential data (e.g., as received from executed access management widget 110 on behalf of executed third-party application 108) to extract an OAuth token, and to establish a consistency between the extracted OAuth token and a locally maintained copy of the OAuth token indicative of a type or level of access to confidential data previously granted to third-party application 108 by user 101. For example, when the extracted OAuth token is consistent with the locally maintained OAuth token, executed validation engine 144 may validate the received request, and computing system 130 may perform any of the exemplary processes described herein to provision the requested elements of confidential data to executed access management widget 110, e.g., across network 170 through a secure, programmatic interface.

In some instances, each of peer systems 180, such as peer system 182, may maintain, within one or more tangible, non-transitory memories, a data repository 184 that includes a local copy of a cryptographically secure distributed ledger 186, which peer systems 180 (including peer system 182) may establish and maintain using any of the exemplary consensus-based processes described herein. For example, as illustrated in FIG. 1, distributed ledger 186 may include ledger blocks, such as smart contract ledger blocks 188, that record elements of code or software instructions that, when executed by each of peer systems 180 (including peer system 182), may modify one or more elements of confidential data to include a digital watermark capable of recognition by a computing system associated with, or operated by, a regulatory, governmental, or legal entity, e.g., in an event of a suspected or detected misuse of or breach involving of the modified elements of the confidential data by third-party application 108 or other unrelated computing systems.

Figure 2A:
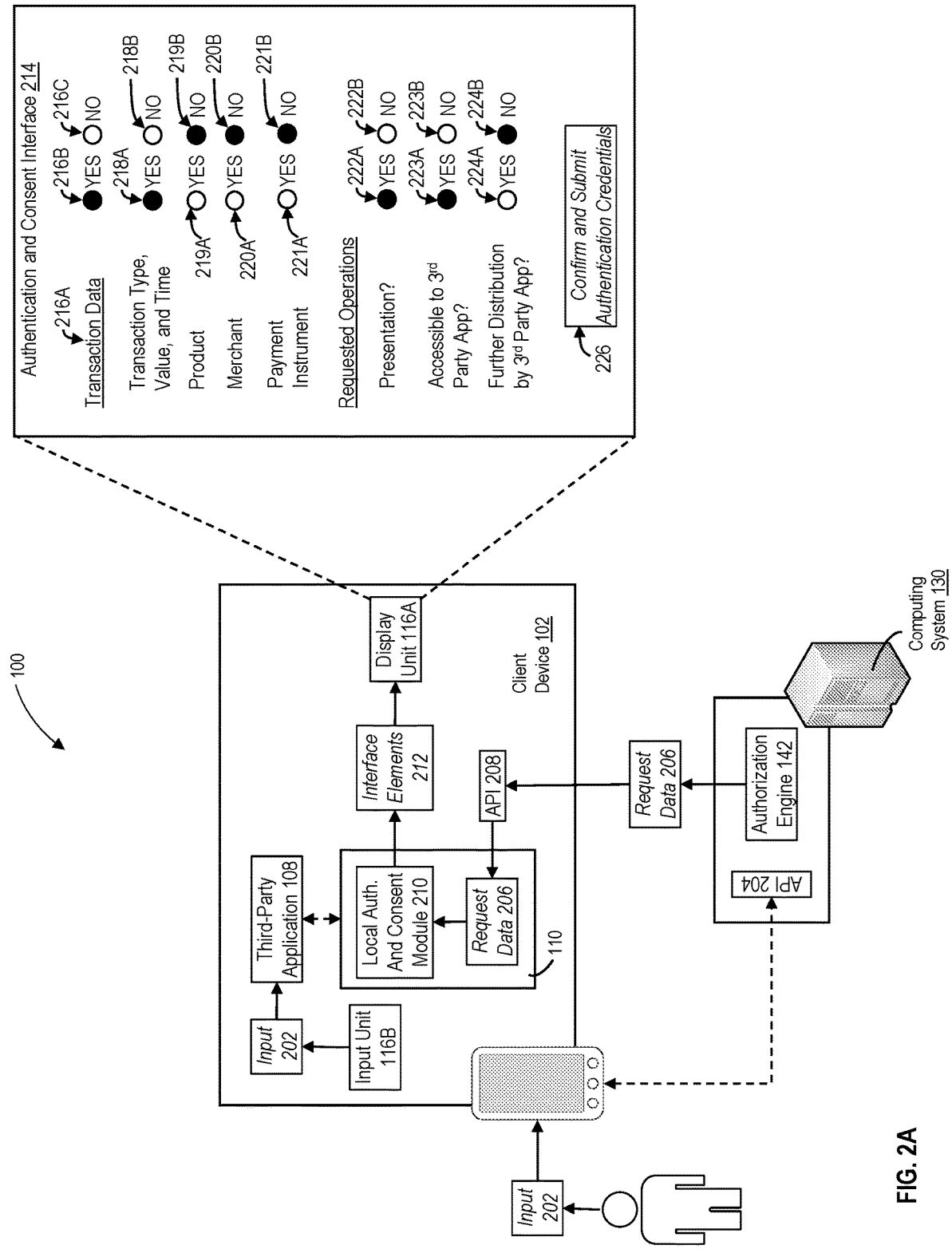
FIGS. 2A-2C, 3A, and 3B are diagrams illustrating portions of an exemplary computing environment, in accordance with some embodiments.
Figure 2B:
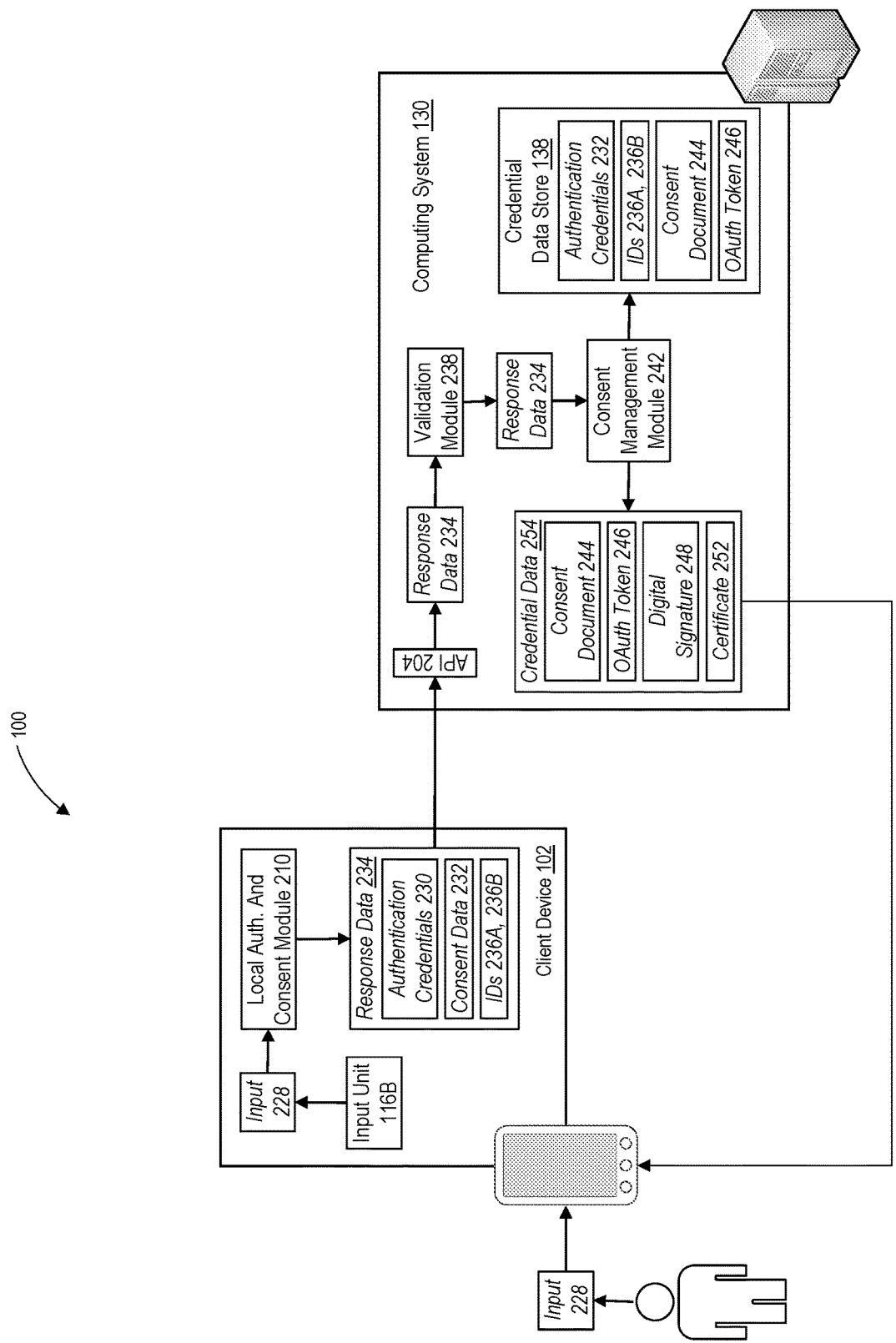
Figure 2C:
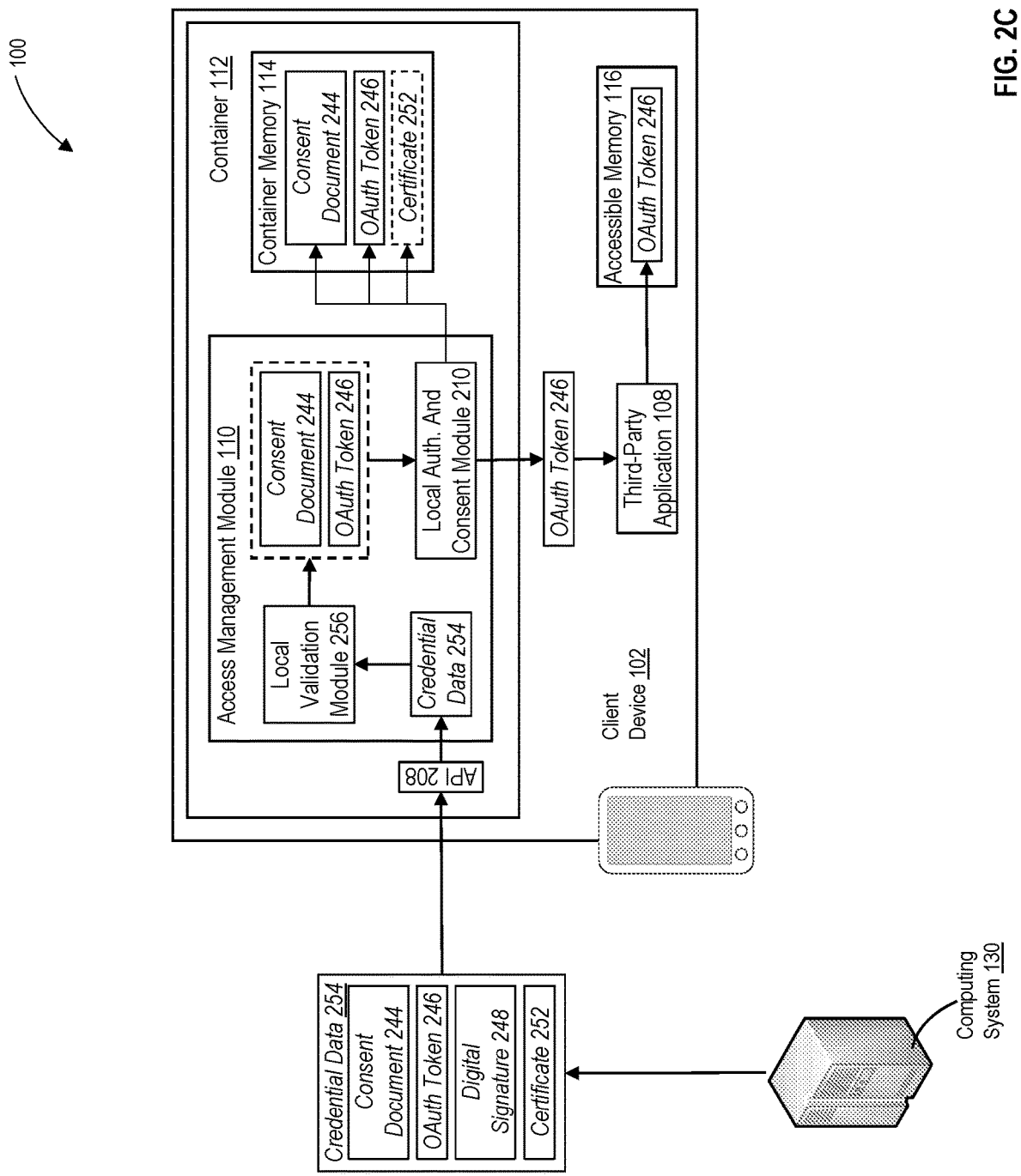

II. Exemplary Processes for Dynamically Implementing and Managing Authentication and Consent Protocols Using Container-Based Applications FIGS. 2A, 2B, and 2C illustrate portions of computing environment 100, in accordance with some exemplary embodiments. Referring to FIG. 2A, user 101 may provide, to input unit 116B of client device 102, input 202 that requests an execution of one or more application programs, such as third-party application 108. Based on input 202, client device 102 may execute third-party application 108, and executed third-party application 108 may further generate programmatic commands that execute one or more contained-based applications, such as access management widget 110, which facilitate secure and trusted communications with corresponding computing systems within environment 100, such as computing system 130.

As described herein, computing system 130 may maintain elements of confidential data on behalf of user 101 and other customers or users, and further, may provision access management widget 110 to client device 102 within a corresponding container-based format, e.g., application container 112 of FIG. 1, that encapsulates access management widget 110 and its dependencies. When executed by client device 102, access management widget 110 may perform any of the exemplary processes described herein to: establish, in conjunction with computing system 130, a level or type of access to confidential data granted by user 101 to third-party application 108, or at access management widget 110 acting on behalf of third-party application 108; dynamically access and obtain requested elements of confidential data from computing system 130 in accordance with the granted level or type of access; and further, perform operations on the on the requested elements of confidential data in accordance with the granted type or level of consent.

Referring back to FIG. 2A, executed access management widget 110 may perform operations that establish a secure channel of communications with a programmatic interface established and maintained by computing system 130, e.g., application programming interface (API) 204. Based on the established communications channel, executed access management widget 110 may perform any of the exemplary processes described herein that, in conjunction with an authorization engine executed by computing system 130 (e.g., authorization engine 142), initiate, implement, and manage one or more of the exemplary token-based authentication and consent protocols described herein.

For example, and responsive to the established communications channel, authorization engine 142 executed by computing system 130 may generate and transmit, across network 170 to client device 102, request data 206 requesting an initiation of a token-based authentication and consent process by executed access management widget 110 (not illustrated in FIG. 1). In some instances, request data 206 may include one or more unique identifiers of computing system 130 (e.g., an assigned internet protocol (IP) address, etc.) or authorization engine 142 (e.g., a cryptogram, hash value, or other element of cryptographic data that uniquely identifies authorization engine 142 to executed access management widget 110). Request data 206 may also include information that identifies certain types or classes of confidential data maintained on behalf of user 101 by computing system 130 (e.g., confidential profile, account, or transaction data, etc.), along with certain data elements associated with each of the types or classes (e.g., elements of profile data that include governmental identifiers, elements of transaction data that include transaction times, transaction values, and identifiers of corresponding merchants or purchased products, elements of account data that include account identifiers, account balances, etc.).

A secure programmatic interface established and maintained by executed access management widget 110, such application programming interface (API) 208, may receive request data 206 from computing system 130 and may route request data 206 to executed access management widget 110. In some instances, a local authentication and consent module 210 of executed access management widget 110 may process request data 206 and generate interface elements 212 that, when rendered for presentation by display unit 116A, collectively establish one or more display screens of a digital authentication and consent interface 214.

In some instances, digital authentication and consent interface 214 may prompt user 101 to provide additional input to client device 102 that specifies whether user 101 grants access management widget 110 permission to access, on behalf of third-party application 108, certain types or classes of the confidential data maintained by computing system 130, e.g., the confidential profile, account, or transaction data maintained on behalf of user 101 by computing system 130. For example, as illustrated in FIG. 2A, digital authentication and consent interface 214 may identify a particular class of confidential data maintained by computing system 130, e.g., transaction data, and may interface elements 216A and 216B, which enable user 101 to grant or deny access to the maintained class of transaction data. Further, should user provide additional input to client device 102 (e.g., via input unit 116B) that selects interface element 216A, which indicates a grant of permission to third-party application 108 (e.g., via access management widget 110) to access one of the more elements of the confidential transaction data, digital authentication and consent interface 214 may present additional interface elements that prompt user 101 to provide further additional input to client device 102 specifying a grant, or a denial, of access to certain elements of the confidential transaction data by third-party application 108.

For example, digital authentication and consent interface 214 may identify one or more elements of the confidential transaction data, e.g., a transaction type, value, and time, and may include interface elements 218A and 218B, which enable user 101 to grant or deny access to confidential data characterizing a transaction type, value, and time for one or more transactions involving user 101. Further, as illustrated in FIG. 2A, digital authentication and consent interface 214 may also include additional interface elements enable user 101 to grant or deny access to confidential data characterizing a payment instrument involved in the one or more transactions (e.g., interface elements 219A and 219B), a product or service involved in the one or more transactions (e.g., interface elements 220A and 220B), and/or a merchant involved in the one or more transactions (e.g., interface elements 221A and 221B).

Further, and as illustrated in FIG. 2A, digital authentication and consent interface 214 may also include interface elements that, when selected by user 101, enable user 101 to permit a performance of one of more operations on the selected classes or elements of confidential data by third-party application 108 or by access management widget 110 acting on behalf of third-party application 108. For example, interface elements 222A and 222B enable user 101 to grant or deny permission for access management widget 110 to present elements of raw, aggregated, modified, or processed confidential data within one or more digital interfaces, e.g., on behalf of third-party application 108. Further, and by way of example, interface elements 223A and 223B identify and enable user 101 to grant or deny permission for access management widget 110 to provision elements of raw confidential data to third-party application 108, and interface elements 224A and 224B identify and enable user 101 to grant or deny permission for third-party application 108 further distribute elements of raw confidential data to additional computing systems operating within environment 100, or to application programs executed by these additional computing systems (e.g., fourth- or fifth-party applications, etc.).

The disclosed embodiments are however, not limited to these exemplary interface elements, and in other instances, digital authentication and consent interface 214 may include interface elements associated with any additional or alternate class or type of confidential data maintained on behalf of user 101 (e.g., the profile data or account data described herein), or any additional or alternate elements of these classes or types of confidential data, or any additional or operations capable of performance by third-party application 108 or by access management widget 110 acting on behalf of third-party application 108. Further, in some instances, digital authentication and consent interface 214 may also include one or more additional interface elements 226 that, when selected by user 101, confirm the access granted level or type of access, and enable user 101 to provide one or more authentication credentials that uniquely identify user 101 to computing system 130, e.g., for submission to computing system 130 during any of the exemplary token-based authentication and consent processes describe herein. Examples of these authentication credentials include, but are not limited to, an alphanumeric login credential, alphanumeric password, or a biometric credential, such as a digital facial image or a digital thumbprint scan.

By way of example, user 101 may provide additional input to client device 102, e.g., via input unit 116B, that selects interface element 216A, which grants third-party application 108 (e.g., via access management widget 110) access to the one or more elements of confidential transaction data maintained on behalf of user 101 by computing system 130. Further, and through the additional input, user 101 may also select interface element 218A, which grants third-party application 108 (e.g., via access management widget 110) access to elements of confidential transaction data characterizing a transaction type, value, and time for one or more transactions involving user 101, and interface elements 219B, 220B, and 221B, which denies third-party application 108 (and access management widget 110) access to any elements of confidential transaction data characterizing a payment instrument, a product or service, or a merchant involved in the one or more transactions.

In some instances, and though the additional input, user 101 may also select interface element 222A, which provides permission for access management widget 110 present elements of raw, aggregated, modified, or processed transaction data within one or more digital interfaces (e.g., on behalf of third-party application 108) and that selects interface element 223A, which provides permission for access management widget 110 to provision elements of raw transaction data to third-party application 108. The additional input may also select interface element 224B, which denies permission for third-party application 108 further distribute elements of raw confidential data to additional computing systems operating within environment 100, or to application programs executed by these additional computing systems (e.g., fourth- or fifth-party applications, etc.). The additional input provided by user 101 may selects interface element 226, which confirms the granted level or type of access and the granted permissions, and may specify the one or more authentication credentials, which identify user 101 to computing system 130.

Referring to FIG. 2B, local authorization and consent module 210 may receive the additional input, e.g., additional input 228, via input unit 116B. In some instances, local authorization and consent module 210 may parse additional input 228 to extract each of the one or more authentication credentials provided in response to digital authentication and consent interface 214, e.g., as authentication credentials 230. Local authorization and consent module 210 may also perform operations that extract, from additional input 228, information that identifies: the selection of interface element 218A, which grants third-party application 108 access (e.g., via access management widget 110) to elements of confidential transaction data characterizing a transaction type, value, and time for one or more transactions involving user 101; and the selection of interface elements 219B, 220B, and 221B, which denies third-party application 108 access to any elements of confidential transaction data characterizing a payment instrument, a product or service, or a merchant involved in the one or more transactions.

The extracted information may also identify the selection of interface element 222A, which provides permission for access management widget 110 present elements of raw, aggregated, modified, or processed confidential data within one or more digital interfaces (e.g., on behalf of third-party application 108) and the selection of interface element 223A, which provides permission for access management widget 110 to provision elements of raw confidential data to third-party application 108. Further, in some instances, the extracted information may identify the selection of interface element 244B, which denies permission for third-party application 108 further distribute elements of raw confidential data to additional computing systems operating within environment 100, or to application programs executed by these additional computing systems (e.g., fourth- or fifth-party applications, etc.).

Local authorization and consent module 210 may perform operations that package the extracted information into corresponding portions of consent data 232. As illustrated in FIG. 2B, local authorization and consent module 210 may generate response data 234, which includes authentication credentials 230 and consent data 232, and perform operations that cause client device 102 to transmit response data 234 across network 170 to API 204, e.g., as a response to request data 206. In some instances, response data 234 may also include a unique identifier 236A of executed access management widget 110 (e.g., a unique cryptogram, hash value, or other element of cryptographic data, etc.) and a unique identifier 236B of client device 102 (e.g., an IP address etc.), and identifiers 236A and 236B may enable executed authorization engine 142 to verify that executed access management widget 110 represents a valid, container-based widget developed and provisioned to client device 102.

API 204 may provide response data 234 as an input to executed authorization engine 142, which may perform any of the exemplary processes described herein to authenticate the identity of user 101 (e.g., based on authentication credentials 230), and determine a level or type of access granted by user 101 (e.g., based on consent data 232). Further, an using any of the exemplary processes described herein, executed authorization engine 142 may also generate a digital token, cryptogram, hash value, or other element of cryptographic data, e.g., an OAuth token, indicative of the successful authentication, and an additional consent document that identifies and characterizes the type or level of access granted to third-party application 108.

For example, as illustrated in FIG. 2B, a validation module 238 of executed authorization engine 142 may receive response data 234, and may perform operations that validate authentication credentials 230 against local authentication credentials assigned to user 101 by computing system 130, e.g., as maintained within one or more data records of user database 134. Further, executed validation module 238 may also perform operations that validate identifier 236A of executed access management widget 110 (e.g., based on a determination that the unique cryptogram is consistent with a predetermined structure or format, a comparison within a local widget identifier maintained within the one or more data records of user database 134, etc.), and additionally, or alternatively, that validate identifier 236B of client device 102 (e.g., based on a comparison with a local device identifier maintained within the one or more data records of user database 134 in conjunction with the local authentication credentials). In some instances, by validating extracted authentication credentials 230 and identifiers 236A and 236B, executed validation module 238 may not only authenticate an identity of user 101, but verify that executed access management widget 110 represents a valid, container-based widget developed and provisioned to client device 102 by computing system 130.

In one instance, if executed validation module 238 were unable to validate authentication credentials 230, or identifiers 236A or 236B, executed authorization engine 142 may decline to validate response data 234, and as such, may decline to grant executed access management widget 110 access elements of confidential data maintained by computing system 130. In some instances, not illustrated in FIG. 2B, executed validation module 238 may generate and transmit an error message across network 170 to client device 102, e.g., via a secure, programmatic interface established and maintained by executed access management widget 110.

Alternatively, if validation module 238 were to validate each of authentication credentials 230 and identifiers 236A and 236B, executed authorization engine 142 may validate response data 234, and may route response data 234 to a consent management module 242 of executed authorization engine 142, along with data confirming the successful validation of authentication credentials 230 and identifiers 236A and 236B (not illustrated in FIG. 2B). In some instances, and based on portions of the confirmation data, consent management module 242 may perform any of the exemplary processes described herein to generate a consent document that reflects a level or type of access granted by user 101 to third-party application 108 or to access management widget 110 acting on behalf of third-party application 108, e.g., as specified within consent data 232. Executed consent management module 242 may also perform any of the exemplary described herein processes to generate a digital token, cryptogram, hash value, or other element of cryptographic data, such as an OAuth token, indicative of the successful authentication of the identity of user 101 and of the level of type of granted access.

By way of example, consent data 232 may indicate that user 101 granted access management widget 110, acting on behalf of third-party application 108, access to elements of confidential transaction data characterizing a transaction type, value, and time for one or more transactions involving user 101, while denying access to any elements of confidential transaction data characterizing a payment instrument, a product or service, or a merchant involved in the one or more transactions. Consent data 232 may also indicate that user 101 granted permission to access management widget 110, acting on behalf of third-party application 108, to present elements of raw, aggregated, modified, or processed confidential data within one or more digital interfaces. Further, consent data 232 may indicate that user 101 granted access management widget 110 permission to provision raw elements of the accessible transaction data (as described herein) to third-party application 18, but denied permission for third-party application 108 further distribute raw elements of the accessible transaction data to additional computing systems operating within environment 100, or to application programs executed by these additional computing systems (e.g., fourth- or fifth-party applications, etc.).

In some instances, executed consent management module 242 may perform operations that package all or a portion of consent data 232 into corresponding portions of a consent document 244 formatted in accordance with one or more data-interchange formats. Examples of the one or more data-interchange formats include, but are not limited to, a JavaScript Object Notation (JSON) format, a YAML format, an Internet-JSON (I-JSON) format, an XML format, or any additional or alternate language-independent, data serialization formats compatible with executed access management widget 110, executed authorization engine 142, and other application programs executed by client device 102 and computing system 130.

Executed consent management module 242 may also perform operations that generate a digital token, cryptogram, hash value, or other element of cryptographic data, e.g., an OAuth token 246, indicative of the successful authentication of the identity of user 101 and of the level or type of access granted to third-party application 108 by user 101, e.g., as specified within consent document 244. OAuth token 246 may, in some instances, be characterized by a predetermined structure or format recognizable by executed authorization engine 142 and further, by executed access management widget 110 and executed third-party application 108. In some examples, executed consent management module 242 may generate OAuth token 246 (or any additional or alternate digital token, cryptogram, hash value, or cryptographic data element) based on an application of one or more tokenization processes to portions of authentication credentials 230, consent data 232, or identifiers 236A or 236B.

As illustrated in FIG. 2B, executed consent management module 242 may perform operations that store, within consent data store 138, consent document 244 and OAuth token 246 in conjunction with now-validated authentication credentials 230, identifier 236A, and identifier 236B. In some instances, the storage of consent document 244 and OAuth token 246, authentication credentials 230 and identifiers 236A and 236B may associate consent document 244 and OAuth token 246 with user 101, with client device 102, and further, with contained-based access management widget 110.

Further, executed consent management module 242 may perform operations that apply a digital signature 248 to consent document 244 (and in some instances, to OAuth token 246) using any appropriate digital signature algorithm in conjunction with private cryptographic key of computing system 130. Executed encryption module 146 may package consent document 244 and OAuth token 246 into corresponding portions of credential data 254, along with digital signature 248 and a public key certificate 252 of computing system 130 (e.g., that includes a corresponding public cryptographic key). Computing system 130 to transmit credential data 254 across network 170 to client device 102 using any appropriate communications protocol, e.g., via the corresponding communications interface, such as the transceiver device.

Referring to FIG. 2C, API 208 of executed access management widget 110 may intercept credential data 254 and route credential data 254 to a local validation module 256 of executed access management widget 110. In some instances, when executed by processor 106, local validation module 256 may parse credential data 254 to extract digital signature 248 and public key certificate 252, and may perform operations that validate digital signature 248 based on the public cryptographic key of computing system 130 included within public key certificate 252. Responsive to the validation of digital signature 248, local validation module 256 may provide consent document 244 and OAuth token 246 as an input to local authorization and consent module 210, which may store consent document 244 and OAuth token 246 within corresponding portions of container memory 114, either alone or in conjunction with public key certificate 252 (e.g., as an identifier of computing system 130).

Further, in some instances, local authorization and consent module 210 may perform further operations that provide OAuth token 246 as an input to executed third-party application 108, e.g., via a secure programmatic interface. As illustrated in FIG. 2B, executed third-party application 108 may perform operations that store OAuth token 246 within a corresponding potion of accessible memory 116, e.g., alone or in conjunction with additional data that identifies computing system 130 and that establishes an association between OAuth token 246 and computing system 130.

By provisioning consent document 244 to a trusted, contained-based application deployed by computing system 130, e.g., container-based access management widget 110, certain of the exemplary embodiments described herein may delegate any determination of a consistency between a requested access to elements of confidential data maintained by computing system 130 (e.g., as generated by executed third-party application 108) and a type or level of access previously granted by user 101, from computing system 130 to access management widget 110 executed by client device 102. By way of example, and upon receipt of a request for one or more elements of confidential data, or for a performance of one or more operations on the elements of confidential data, from third-party application 108, executed access management widget 110 may perform operations that, among other things, establish that the requested access is consistent with the previously granted level or type of access specified within consent document 244, e.g., as maintained locally within container memory 114.

As described herein, and responsive to an established consistency between the requested elements of the confidential data and the granted access specified within locally maintained consent document 244, executed access management widget 110 may route the request for the elements of confidential data and a corresponding OAuth token, e.g., OAuth token 246, across network 170 to computing system 130 via a secure programmatic interface. In some examples, computing system 130 may receive the request and OAuth token 246, and may perform operations that provision the requested elements of confidential data (e.g., in encrypted form) based not on any further evaluation of the consistency between the requested and the level or type of access previously granted by user 101, but instead based on a determined validity of OAuth token 246.

Certain of these exemplary processes, which enable computing system 130 to rely a consent determination implemented by a trusted, container-based application deployed to client device 102 when provisioning confidential data to a third-party application, may be implemented in addition to, or as an alternate to, conventional processes through which computing system 130 provisions confidential data requested by the third-party application in response to both a determined consistency between both a received OAuth token and a locally maintained OAuth token, and a determined consistency between the requested elements of confidential data and a the level or type of access previously granted to the third-party application by user 101, e.g., as specified within locally maintained consent data. By delegating any determination of the consistency between the third-party application's request for confidential data and the level or type of access previously granted to the third-party application to the trusted, container-based application, certain of these exemplary processes may increase an efficiency at which computing system 130 provisions requested elements of confidential data (e.g., as computing system 130 only validated the received OAuth token) and reduces instances or potential fraudulent activity or unauthorized access (e.g., as any inconsistency between the requested and granted access would be detected and mediated at client device 102, and not at computing system 130).

Figure 3A:
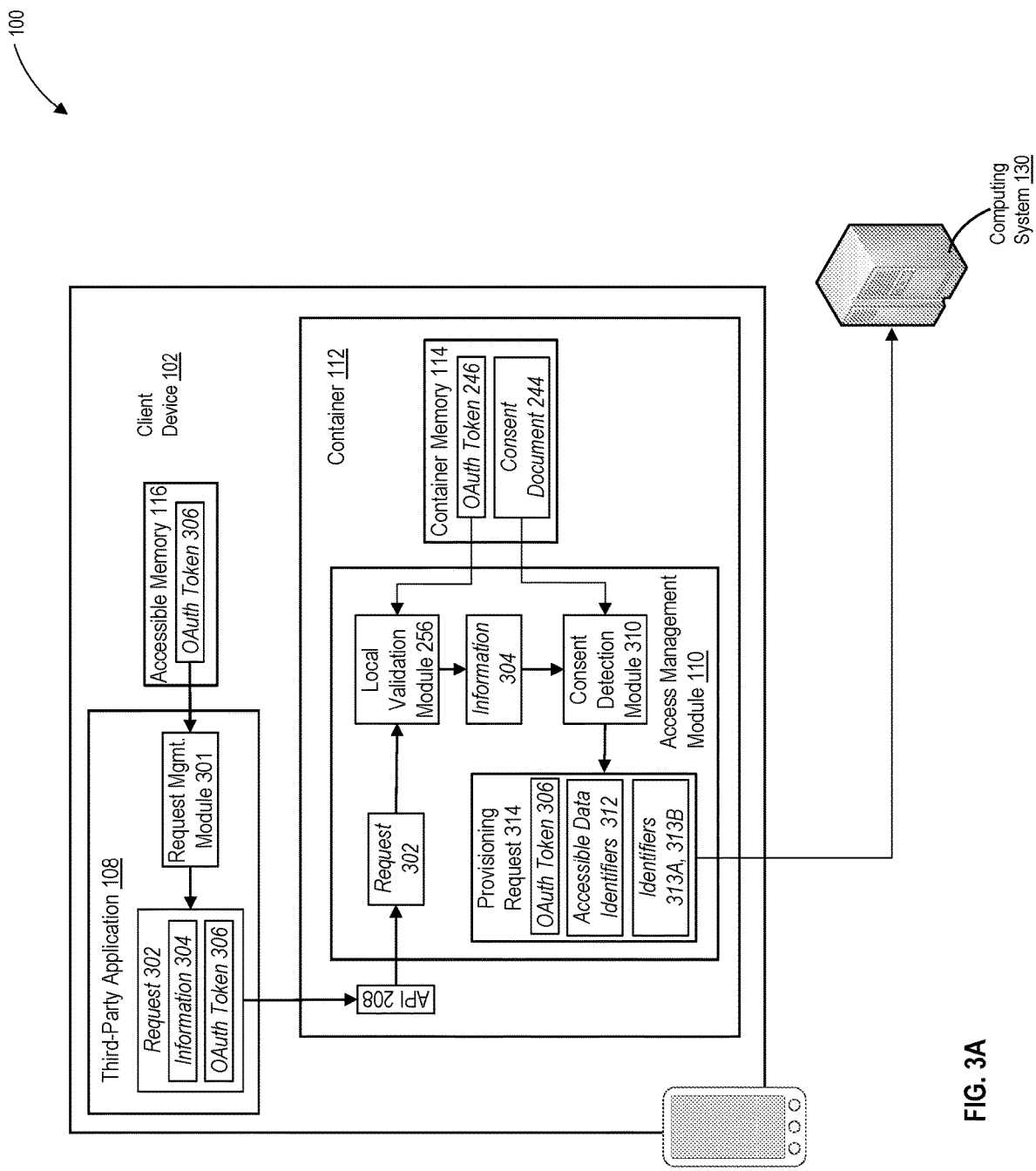
Figure 3B:
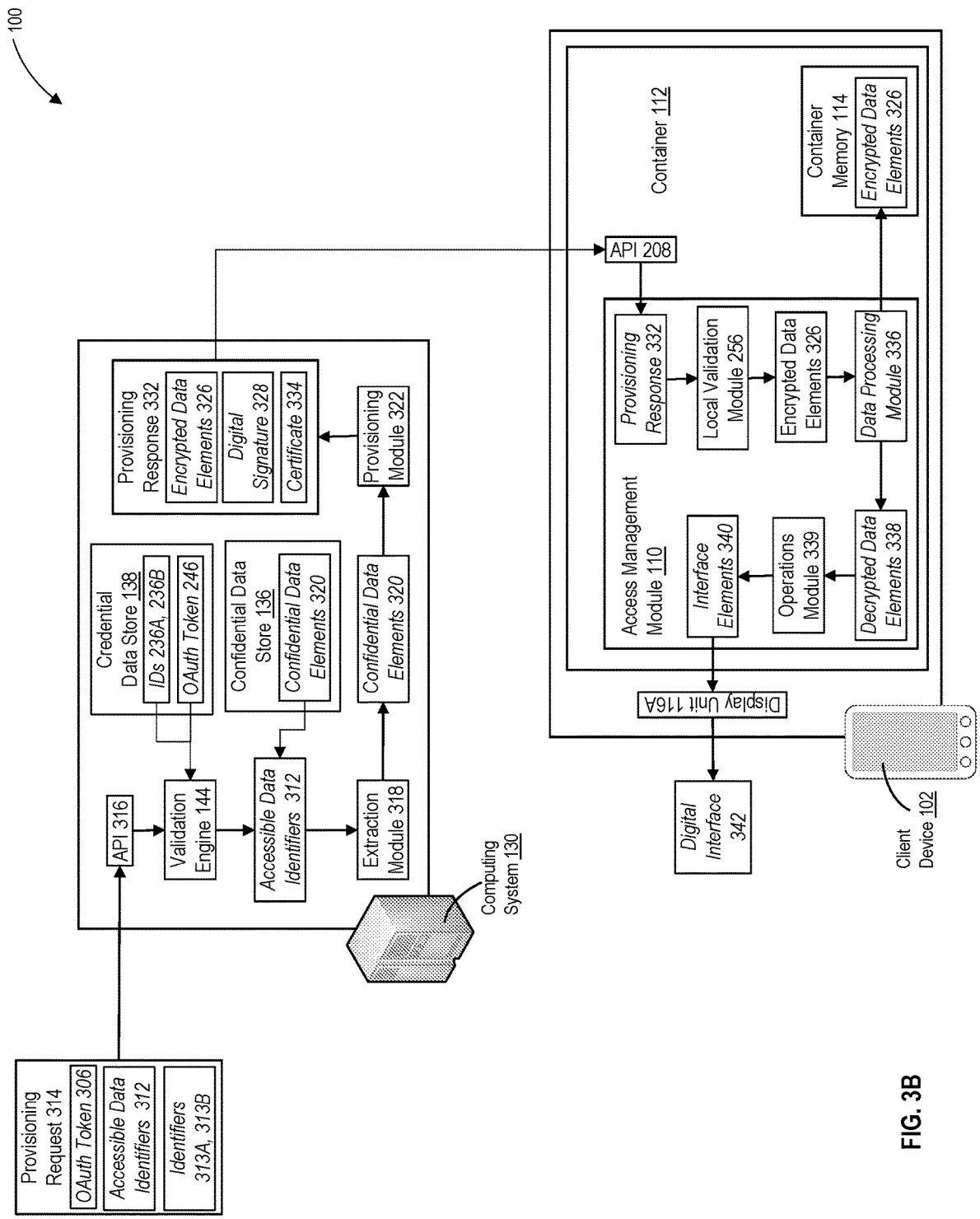

FIGS. 3A and 3B illustrate additional portions of computing environment 100, in accordance with some exemplary embodiments. Referring to FIG. 3A, and upon execution by processor 106 of client device 102, one or more application modules of third-party application 108, such as request management module 301, may generate a request 302 to perform one or more operations on elements of confidential data maintained on behalf of user 101 by one or more network-connected computing systems within environment 100, such as the elements of confidential profile, account, and transaction data maintained by computing system 130 within confidential data store 136. By way of example, and as described herein, executed third-party application 108 may include, but is not limited to, a financial management application, a financial aggregator application, or financial planning application, and the one or more operations may include, but are not limited to, an aggregation, a processing, or a modification to one or more of the elements of confidential profile, account, and transaction data, or a presentation of one or more raw, aggregated, processed, and/or modified elements of confidential profile, account, and transaction data within a digital interface.

For example, request 302 may correspond to a request, generated by executed third-party application 108, to present a current account balance of a credit card account held by user 101 and data characterizing a specified number of recent purchase transactions involving that credit card account (e.g., the third-most recent purchase transactions involving the credit card account.) within a digital interface. In some instances, request 302 may include information 304 that identifies each of the one or more requested operations (e.g., the presentation of the account balance and the transaction data within the digital interface), and that identifies each of the one or more elements of confidential data associated with the requested operations (e.g., elements of account data and transaction data maintained by computing system 130).

Further, executed request management module 301 may also obtain an OAuth token 306 from accessible memory 116, and may package OAuth token 306 within a corresponding portion of request 302. In some instances, OAuth token 306 may be provisioned to third-party application 108 by access management widget 110 based on a successful outcome of any of the exemplary token-based authorization and consent processes described herein, and may be indicative of an authentication of an identity of user 101 by computing system 130 and a prior grant of a particular type or level of access to third-party application 108 by user 101. As illustrated in FIG. 3A, executed third-party application 108 may provide request 302 as an input to executed access management widget 110 via a programmatic interface maintained within application container 112, such as API 208.

By way of example, local validation module 256 of executed access management widget 110 may receive request 302 from API 208, may parse request 302 to obtain OAuth token 306, and may perform operations that validate extracted OAuth token 306. By way of example, when executed by access management widget 110, local validation module 256 may perform operations that compare OAuth token 306 against a local copy of an OAuth token, e.g., OAuth token 246, maintained within container memory 114. In one instance, if executed local validation module 256 were to detect an inconsistency between OAuth token 306 (e.g., as received from executed third-party application 108) and OAuth token 246 (e.g., as maintained within container memory 114), executed local validation module 256 may decline to validate extracted OAuth token 306, and executed access management widget 110 may discard request 302 and generate and transmit an error message to executed third-party application 108.

In other instances, if executed local validation module 256 were to determine that extracted OAuth token 306 corresponds to or matches locally maintained OAuth token 246, executed local validation module 256 may validate OAuth token 306 and request 302. Executed local validation module 256 may extract, from request 302, information 304 that identifies each of the one or more requested operations and each of the elements of confidential data associated with the requested operations, and may provide information 304 as an input to a consent detection module 310 of executed access management widget 110. When executed by client device 102 (e.g., based on one or more commands programmatically generated by access management widget 110), consent detection module 310 may access consent document 244, e.g., as maintained within container memory 114, and based on a comparison between consent document 244 and information 304, determine whether each of the one or more requested operations, and the associated the elements of confidential data, are consistent with the level or type of access to previously granted by user 101.

If, for example, executed consent detection module 310 were to detect an inconsistency between the previously granted level or type of access (e.g., as specified within consent document 244) and either (i) the one or more requested operations or (ii) the associated elements of confidential data, consent detection module 310 may determine that the request 302 is inconsistent with the previously granted type or level of access. In some instances (not illustrated in FIG. 3A), executed access management widget 110 may discard request 302, and may generate and transmit an error message to executed third-party application 108, e.g., via a secure, programmatic interface.

Alternatively, if consent detection module 310 were to establish a consistency between the access previously granted to third-party application 108 and each of the requested operations and each of the associated elements of confidential data, consent detection module 310 may perform operations that extract, from information 304, identifiers of the one or more elements of confidential data associated with the requested operations, and package these identifiers into corresponding portions of accessible data identifiers 312. Further, executed consent detection module 310 may generate a provisioning request 314 that includes accessible data identifiers 312 and OAuth token 306, along with a unique identifier 313A of executed access management widget 110 (e.g., a unique cryptogram, hash value, or other element of cryptographic data, etc.) and a unique identifier 313B of client device 102 (e.g., an IP address etc.). Identifies 313A and 313B may, for example, enable executed authorization engine 142 to verify that executed access management widget 110 represents a valid, container-based widget developed and provisioned to client device 102, and consent detection module 310 may perform operations that cause client device 102 to transmit provisioning request across network 170 to computing system 130, e.g., via communications interface 118.

In other instances, consent detection module 310 may establish that one or more of the requested operations, or that one or more of the elements of confidential data associated with the requested operations, are partially inconsistent or fully inconsistent with the previously granted type or level of access. By way of example, consent document 244 may specify that user 101 granted permission for access management widget 110 to present, on behalf of third-party application 108 and through a corresponding digital interface, elements of confidential account data that characterize a current account balance of one or more financial services accounts held by user 101, including the credit card account described herein, and elements of confidential transaction data characterizing a transaction type, value, and time for one or more transactions involving user 101.

Additionally, consent document 244 may also specify that user 101 denied third-party application 108 access to any raw element of confidential data maintained by computing system 130, and that user 101 denied access management widget 110 permission to present, on behalf of third-party application 108, elements of confidential transaction data characterizing a payment instrument, a product or service, or a merchant involved in the one or more transactions. The disclosed embodiments are, however, not limited to these examples of accessible elements of confidential data or permitted operations, and in other instances, consent document 244 may identify any additional or alternate type or level of access to confidential data granted or denied to third-party application 108 by user 101, or any additional or alternate permissible or impermissible operation, that would be appropriate to third-party application 108, access management widget 110, and computing system 130.

For example, and referring back to FIG. 3A, consent detection module 310 may establish a consistency between the level or type of access granted to third-party application 108 by user 101 (e.g., as specified within consent document 244) and (i) the requested operation (e.g., the presentation of the account balance and the transaction data within the digital interface, as specified within information 304) and (ii) the associated element of confidential account data associated with the requested operation (e.g., the current account balance of the credit card account held by user 101, as specified within information 304 304). Based on the established consistency, executed consent detection module 310 may parse information 304 to extract one or more identifiers of the element of confidential account data associated with the requested operation (e.g., the current account balance of the credit card account), and package the one or more extracted identifiers within a corresponding portion of accessible data identifiers 312. The one or more extracted identifiers may include, but are not limited to, a data type associated the requested elements of confidential account data (e.g., the current account balance), an identifier of user 101 (e.g., a portion of authentication credentials 230, which uniquely identify user 101 at computing system 130), or an identifier of the credit card account held by user 101 (e.g., a name of the credit card account, a portion of a tokenized account number, etc.).

Consent detection module 310 may also establish the elements of confidential transaction data associated with the requested operation, e.g., data characterizing transactions involving that credit card account within the particular temporal interval, are partially consistent with the level or type of access granted to third-party application 108. For example, while consent document 244 may specify that user 101 granted third-party application 108 access to confidential transaction data, consent document 244 may also specify that user 101 limited an accessibility of the confidential transaction data to those elements that characterize the transaction type, value, and time for transactions involving user 101. As such, consent detection module 310 may establish that the elements of confidential transaction data associated with the requested operation are broader in composition that the accessible elements of confidential transaction data specified within consent document 244, and as such, that the requested elements of confidential transaction data are partially consistent with the previously granted access.

In response to the established partial consistency, executed consent detection module 310 may parse information 304 to extract one or more identifiers of the elements of confidential transaction data associated with the requested operation (e.g., the data characterizing transactions involving that credit card account within the particular temporal interval), and package the extracted identifiers within an additional portion of accessible data identifiers 312. The one or more extracted identifiers may include, but are not limited to, a data type associated the requested elements of confidential transaction data (e.g., raw transaction data), an identifier of user 101 (e.g., a portion of authentication credentials 230, which uniquely identify user 101 at computing system 130), an identifier of the credit card account held by user 101 (e.g., a name of the credit card account, a portion of a tokenized account number, etc.), and the particular temporal interval (e.g., twenty-four hours, etc.).

Further, and based on the established partial consistency, consent detection module 310 may also package into accessible data identifiers 312, additional data that identifies those accessible elements of accessible transaction data specified within consent document 244, e.g., the transaction type, value, and time. Executed consent detection module 310 may generate provisioning request 314 that includes accessible data identifiers 312, OAuth token 306, and in some instances, identifiers 313A and 313B as described herein, and may perform operations that cause client device 102 to transmit provisioning request 314 across network 170 to computing system 130, e.g., via communications interface 118.

Referring to FIG. 3B, a secure, programmatic interface established and maintained by computing system 130, such as application programming interface (API) 316 may receive and route provisioning request 314 to validation engine 144 of computing system 130. When executed by the one or more processors of computing system 130, validation engine 144 may parse provisioning request 314 to extract identifiers 313A and 313B and further, to extract OAuth token 306. Executed validation engine 144 may also access consent data store 138 and extract locally maintained identifiers of executed access management widget 110 (e.g., identifier 236A) and of client device 102 (e.g., identifier 236B), and a locally maintained copy of the OAuth token provisioned to executed access management widget 110 (e.g., OAuth token 246).

In some instances, executed validation engine 144 may perform operations that validate identifier 313A of executed access management widget 110 (e.g., based on a comparison with locally maintained identifier 236A) and that validate identifier 313B of client device 102 (e.g., based on a comparison with locally maintained identifier 236B). In some instances, by validating extracted identifiers 313A and 313B, executed validation engine 144 may verify that executed access management widget 110 represents a valid, container-based widget developed and provisioned to client device 102 by computing system 130.

If executed validation engine 144 were unable to validate extracted identifier 313A or extracted identifier 313B, executed validation engine 144 may perform operations that generate and transmit an error message across network 120 to client device 102, e.g., via API 208 (not illustrated in FIG. 3B). Alternatively, if executed validation engine 144 were to validate extracted identifier 313A and extracted identifier 313B, executed validation engine 144 may verify that executed access management widget 110 represents a valid, container-based widget, and may perform further operations that validate OAuth token 306 (e.g., as extracted from provisioning request 314) based on a comparison with locally maintained OAuth token 246 (e.g., as extracted from consent data store 138). For example, if executed validation engine 144 were to detect an inconsistency between OAuth token 306 and locally maintained OAuth token 246, executed validation engine 144 may decline to provision any of the requested elements of confidential data to access management widget 110, and may perform operations that generate and transmit an error message across network 120 to client device 102, e.g., via API 208 (not illustrated in FIG. 3B).

In other instances, if executed validation engine 144 were to establish a consistency between OAuth token 306 and locally maintained OAuth token 246 (e.g., that OAuth token 306 matches OAuth token 246), executed validation engine 144 may validate provisioning request 314 and further, may rely on a prior determination by executed access management widget 110 that the requested elements of confidential data (e.g., as specified by accessible data identifiers 312) comply and are consistent with the level or type of access previously granted to third-party application 108 by user 101 (e.g., as specified within consent document 244). Executed validation engine 144 may perform operations that extract accessible data identifiers 312 from provisioning request 314, and may provide accessible data identifiers 312 as input to extraction module 318 of computing system 130.

When executed by the one or more processors of computing system 130, extraction module 318 may access confidential data store 136, and identify and extract one or more elements of confidential data 320 that correspond to accessible data identifiers 312. For example, the elements of confidential data 320 may include, among other things, the current account balance of the credit card account held by user 101 (e.g., a balance of $3,775.00), and elements of transaction data that specify a transaction time or date, a transaction type, and a transaction value of each of the thirty, most-recent purchase transactions involving the credit card account.

In some instances, executed extraction module 318 may provide the elements of confidential data 320 as inputs to a provisioning module 322. When executed by the one or more processors of computing system 130, provisioning module 322 may encrypt each of the elements of confidential data 320 using, for example, a public cryptographic key associated with or assigned to access management widget 110, and may output elements of encrypted confidential data 326. Further, executed provisioning module 322 may also perform operations that apply a digital signature 328 to the elements of encrypted confidential data 326, e.g., using any appropriate digital signature algorithm in conjunction with a private cryptographic key of computing system 130.

Executed encryption module 146 may package the elements of encrypted confidential data 326 into corresponding portions of a provisioning response 332, along with digital signature 328 and a public key certificate 334 of computing system 130 (e.g., that includes a corresponding public cryptographic key). In some instances, executed provisioning module 322 may perform operations that cause computing system 130 to transmit provisioning response 332 across network 170 to client device 102 using any appropriate communications protocol, e.g., via the corresponding communications interface, such as the transceiver device.

API 208 of executed access management widget 110 may receive provisioning response 332 (e.g., on behalf of executed third-party application 108), and may route provisioning response 332 to local validation module 256 of executed access management widget 110. In some instances, when executed by processor 106 of client device 102, local validation module 256 may parse provisioning response 332 to extract digital signature 328 and public key certificate 334, and may perform operations that validate digital signature 328 based on the public cryptographic key of computing system 130 included within public key certificate 334. If, for example, local validation module 256 were unable to validate digital signature 328, local validation module 256 may determine that at least a portion of provisioning response 332 was corrupted during transmission or was modified by an unauthorized third party (e.g., a malicious actor through a man-in-the-middle attack, etc.), and executed access management widget 110 may discard provisioning response 332 and await additional provisioning response generated and transmitted by computing system 130 (not illustrated in FIG. 3B).

In other examples, responsive to the validation of digital signature 328, local validation module 256 may provide the elements of encrypted confidential data 326 as an input to a data processing module 336 of executed access management widget 110. When executed by processor 106 of client device 102, data processing module 336 may perform operations that store the elements of encrypted confidential data 326 within a corresponding portion of container memory 114, which is isolated from and inaccessible to third-party application 108. Further, in some instances, executed data processing module 336 may access a private cryptographic key of access management widget 110, e.g., as maintained within an additional portion of container memory 114, and may decrypt the elements of encrypted confidential data 326 (e.g., to generate decrypted elements of confidential data 338). Executed data processing module 336 may route he decrypted elements of confidential data 338 to an operations module 339 of executed access management widget 110, which when executed by client device 102, performs the one or more operations on the decrypted elements of confidential data 338 that are requested by executed third-party application 108 (e.g., as specified by information 304 within request 302) and that are consistent with the level or type of access previously granted to third-party application 108 by user 101 (e.g., as specified within consent document 244).

The one or more requested operations may include, among other things, processes that aggregate, transform, or modify certain of the decrypted elements of confidential data 338, and that provision the aggregated, transformed, or modified elements of confidential data 320 to executed third-party application 108 (e.g., via a secure, programmatic interface), while maintaining the isolation and security of the elements of encrypted confidential data within container memory 114. In other instances, and in accordance with the level or type of access previously granted to third-party application 108 by user 101, executed local data processing module 336 may perform operation provision certain of the decrypted elements of confidential data 338, e.g., in raw form without aggregation, transformation, or modification, to executed third-party application 108 via the secure, programmatic interface.

Additionally, in some examples, the requested operations may also include presenting the decrypted elements of confidential data 338 within a corresponding digital interface, while maintaining the isolation and security of the elements of encrypted confidential data within container memory 114. For instance, and referring back to FIG. 3B, executed operations module 339 may perform operations that generate one or more interface elements 340 that provide a graphical or textual representation of corresponding ones of the decrypted elements of confidential data 320. Operations module 339 may route each of generated interface elements 340 to display unit 116A of client device 102, which may render generated interface elements 340 for presentation within digital interface 342.

Figure 3C:
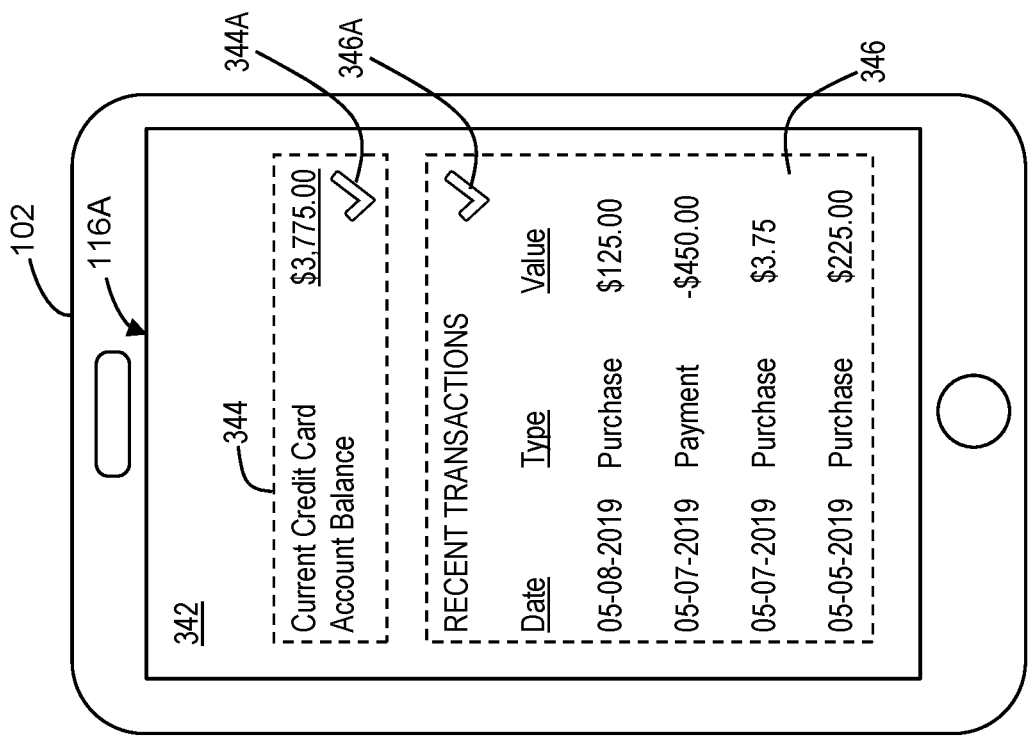
FIG. 3C is a diagram of an exemplary digital interface, in accordance with some embodiments.

For example, as illustrated in FIG. 3C, digital interface 342 may include interface element 344, which when rendered for presentation, identifies a current account balance of $3,775.00 for the credit card account held by user 101. Further, digital interface 342 may also include additional interface elements 346, which when rendered for presentation, identify the transaction dates, transaction types, and transaction values of at least a portion of the thirty, most-recent transactions involving the credit card account of user 101. In some instances, executed access management widget 110 may perform operations that generate and present the digital interface requested by executed third-party application 108, e.g., digital interface 342, autonomously and while maintaining an isolation of the encrypted elements of confidential data 326 from executed third-party application 108 within secure portions of container memory 114.

In some exemplary embodiments, executed access management widget 110 may to perform operations that confirm, to user 101, that certain of the presented elements of confidential data 320, e.g., the account balance of the credit card account within presented interface elements 344 and the transaction dates, transaction types, and transaction values within presented interface elements 346, were obtained from a trusted, secure source or custodian, such computing system 130. For instance, and as described herein, executed local validation module 256 may validate digital signature 328 included within provisioning response 332, and based on the successful validation of digital signature 328, executed access management widget 110 may not only verify an integrity of provisioning response 332, but also determine that computing system 130, which generated the elements of encrypted confidential data 326, represents a secure and trusted source of data characterizing the credit card account held by user 101.

In some instances, and based on the determination that computing system 130 represents a secure and trusted data source, data processing module 336 may generate one or more additional interface elements that, when rendered for presentation within digital interface 342 (e.g., by display unit 116A), provide a visual confirmation to user 101 of not only the trusted nature of each of the presented elements of confidential data 320, but also the trusted and secure nature of the source of confidential data 320. For example, as illustrated in FIG. 3C, local data processing module 336 may generate, and display unit 116A may render for presentation, an additional interface element 344A that confirms visually to user 101 the trusted nature of the presented account balance of the credit card account (e.g., within interface elements 344) and that computing system 130 represents a trusted secure source for the presented account balance.

Further, local data processing module 336 may generate, and display unit 116A may render for presentation, an additional interface element 346A that confirms visually to user 101 the trusted nature of the presented transactions times, types, and amounts (e.g., within interface elements 346), and that computing system 130 represents a trusted secure source for the presented account balance. As illustrated in FIG. 3C, display unit 116A may render each of additional interface elements 344A and 346A at positions within digital interface 342 that are proximate to respective ones of interface elements 344A and 344B.

Further, additional interface elements 344A and 346A include one or more icons or glyphs, which may be predetermined by access management widget 110 or which may be selected by user 101 (e.g., based on puppet provided to client device 102 in response to an additional digital interface). In some instances, the one or more icons, glyphs, or digital images may be associated with, and specific to, a particular source of confidential data, such as computing system 130, and examples of additional interface elements 344A and 346A include, but are not limited to, a check mark (illustrated in FIG. 3C), a padlock, or any additional or alternate image that conveys visually to user 101 the secure and trusted nature of the presented confidential data and the sources of that confidential data. Additionally, or alternatively, additional interface elements 346A and 346B may include a digital image provided to access management widget 110, selected by user 101 from one or more candidate images presented to user 101 through a corresponding digital interface, or captured by a digital camera incorporated into or in communication with client device 102.

In some examples, third-party application 108 may generate and provide, to executed access management widget 110 via API 208, a request (e.g., request 302 of FIG. 3A) that executed access management widget 110 perform operations on elements of confidential data maintained on behalf of user 101 by one or more network-connected computing systems within environment 100, such as the confidential elements of profile, account, and transaction data maintained by computing system 130. For example, the requested operations may include, but are not limited to, a presentation of certain elements of confidential data within a digital interface, and executed access management widget 110 may perform any of the exemplary processes described herein to validate an OAuth token included within request 302 (e.g., based on OAuth token 246 maintained within container memory 114) and to verify that the requested operations are consistent with a level or type of access previously granted by user 101 (e.g., based on consent document 244 maintained within container memory 114). Based on the validation of the OAuth token and on the verified consistency between the requested operations and the previously granted level or type of access, executed access management widget 110 may perform any of the exemplary processes described herein to obtain the elements of confidential data from computing system 130, and to perform the requested operations on the confidential data.

In other examples, the requested operations may include, but are not limited to, operations that aggregate, process, or modify certain of the elements of confidential data, and that generate aggregated, processed, or modified output data for presentation within the corresponding digital interface, or for provisioning back to executed third-party application 108. The aggregated, processed, or modified output may, in some instances, specify a total number or value of transactions involving one or more accounts of payment instruments held by user 101 during a particular temporal interval, or involving certain counterparties (e.g., merchants or retailers, etc.), characterized by certain transaction types (e.g., credit, debit, etc.), or involving certain product or services.

The aggregated, processed, or modified output may also include statistical data characterizing these transactions, such as a transaction frequency or an average transaction value. The disclosed embodiments are, however, not limited to these examples of aggregated, processed, or modified output, and in further instances, portions of the executed aggregated, processed, or modified output may include any additional or alternate value or metric derived from or based on the elements of confidential data obtained from computing system 130 and maintained securely within container memory 114.

In other exemplary embodiments, described below in reference to FIGS. 4A and 4B, executed third-party application 108 may also request, from executed access management widget 110, access to one or more of the raw elements of confidential data obtained from computing system 130, which may be maintained securely within portions of container memory 114 inaccessible to third-party application 108. For instance, and using any of the exemplary processes described herein, executed access management widget 110 may perform operations that obtain one or more elements of confidential profile, account, and transaction data from computing system 130, and that store each of the obtained elements of confidential profile, account, and transaction data within a portion of container memory 114 inaccessible to executed third-party application 108. As described herein, and responsive to a request received from executed third-party application 108 (e.g., via API 208 of FIG. 3A), executed access management widget 110 may perform operations that verify a corresponding OAuth token within the received request and further, that establish whether the requested access to the raw elements of confidential profile, account, or transaction data is consistent with a level or type of access previously granted by user 101, e.g., based on consent document 244.

As described herein, if executed access management widget 110 were to establish the user 101 granted executed third-party application 108 access to the raw elements of confidential data maintained within container memory 114, executed access management widget 110 may perform further operations that parse consent document 244 to determine whether, and to what extent, user 101 granted third-party application 108 permission to distribute all or selected portions of the raw elements of confidential data to additional computing systems operating within environment 100, e.g., to fourth- or fifth-party systems or to additional applications executed by these fourth- or fifth-party systems. Responsive to a determination that user 101 granted permission for third-party application 108 to access one or more of the raw elements of confidential data, but did not permit any further distribution of those raw elements of confidential data to the other computing systems, executed access management widget 110 may perform any of the exemplary processes described herein that, either alone or in conjunction with one or more of peer systems 180, digitally modify selected portions of the raw elements of confidential data prior to distribution to third-party application 108 (e.g., through an application of one or more appropriate digital watermarks, etc.).

In some instances, although invisible and undetectable by executed third-party application 108, the additional computing systems, or the application programs executed by the additional computing systems, the digitally modified portions of the confidential data may be recognizable by a computing system operated by a centralized authority, such as, but not limited to, a regulatory, governmental, or legal entity, or a consortium or industry group of financial institutions or related entities. For example, the digital modification of the accessible raw elements of confidential data may enable the computing system operated by the centralized authority to identify and track those raw elements of confidential data provisioned to third-party application 108 in an instance of a subsequent breach or subsequent misuse. Certain of these disclosed exemplary embodiments may enable executed access management widget 110 to mediate an ability of a third-party application, such as executed third-party application 108, to access or distribute raw elements of confidential data in a manner inconsistent with the level or type of access previously granted to by user 101.

Figure 4A:
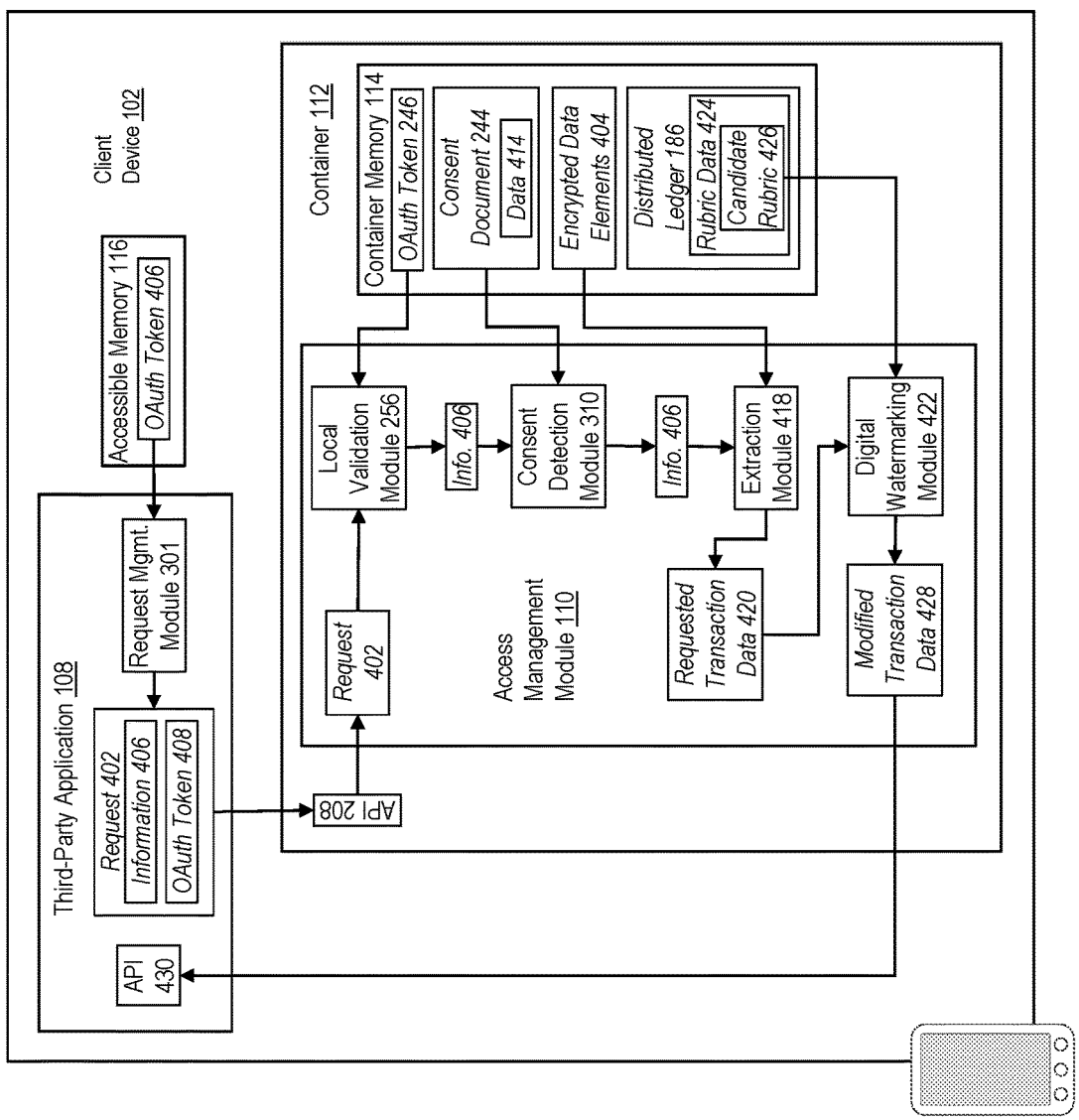
FIGS. 4A and 4B are diagrams illustrating portions of an exemplary computing environment, in accordance with some embodiments.
Figure 4B:
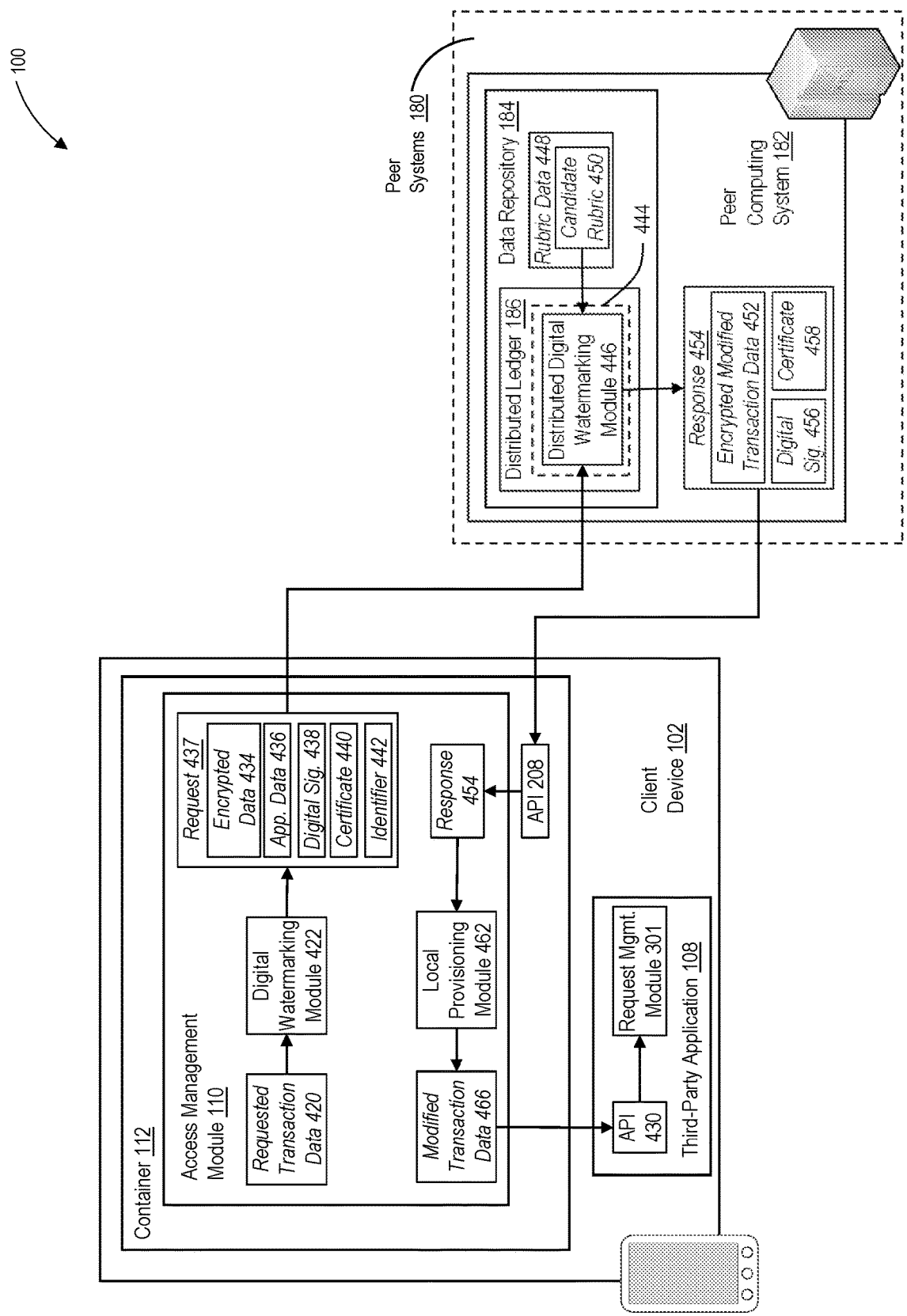

Referring to FIG. 4A, executed third-party application 108 may perform any of the exemplary processes described herein to generate a request 402 to access one or more elements of raw confidential data maintained securely within container memory 114 by executed access management widget 110 (e.g., via executed request management module 301, as described herein). By way of example, and as illustrated in FIG. 4A, executed access management widget 110 may maintain, within container memory 114, one or more encrypted elements of confidential data 404, which may include, but are not limited, raw elements of confidential profile, account, or transaction data obtained by executed access management widget 110 from computing system 130 using any of the exemplary processes described herein.

The requested elements of confidential data may, for example, include elements of transaction data characterizing a specified number of prior transactions involving a payment instrument held by user 101 (e.g., the thirty, most-recent purchase transactions involving a credit card held by user 101), and request 402 may include information 406 that identifies the request by third-party application 108 to access elements of raw transaction data maintained within container memory 114, and that identifies each of the requested elements of confidential transaction data, e.g., transaction data characterizing the thirty, most-recent purchase transactions involving a credit card held by user 101. Further, request 402 may include an OAuth token 408 indicative of a successful outcome of one or more of the exemplary token-based authentication and consent processes described herein.

As illustrated in FIG. 4A, executed third-party application 108 may provide request 402 as an input to executed access management widget 110 via a programmatic interface maintained within application container 112, such as API 208. In some instances, local validation module 256 of executed access management widget 110 may receive request 402 from API 208, may parse request 402 to obtain OAuth token 408, and may perform any of the exemplary processes described herein to validate extracted OAuth token 408, e.g., based on a comparison between received OAuth token 408 and OAuth token 246 maintained locally within container memory 114. In one instance, if executed local validation module 256 were to detect an inconsistency between OAuth token 408 (e.g., as received from executed third-party application 108) and OAuth token 246 (e.g., as maintained within container memory 114), executed local validation module 256 may decline to validate extracted OAuth token 408, and executed access management widget 110 may discard request 402 and generate and transmit an error message to executed third-party application 108 (not illustrated in FIG. 4A).

In other instances, if executed local validation module 256 were to determine that received OAuth token 408 corresponds to or matches locally maintained OAuth token 246, executed local validation module 256 may validate OAuth token 306 and request 402. Executed local validation module 256 may perform additional operations that extract, from request 402, information 406 that identifies the request by third-party application 108 to access elements of raw transaction data maintained within container memory 114, and that identifies the requested elements of raw transaction data characterizing the thirty, most-recent purchase transactions involving a credit card held by user 101, and may provide information 406 as an input to consent detection module 310 of executed access management widget 110. When executed by client device 102 (e.g., based on one or more commands programmatically generated by access management widget 110), consent detection module 310 may access consent document 244, e.g., as maintained within container memory 114, and based on a comparison between consent document 244 and portions of information 406, determine whether (and in some instances, to what extent) user 101 previously granted executed third-party application 108 access to the requested elements of raw transaction data maintained within container memory 114.

In one instance, and based on portions of consent document 244, executed consent detection module 310 may determine that user 101 denied third-party application 108 access to any of the requested elements of raw transaction data, e.g., the elements of raw transaction data maintained within container memory 114 and characterizing the thirty, most-recent purchase transactions involving a credit card held by user 101. In response to this determination, executed access management widget 110 may discard request 302, and may generate and transmit an error message to executed third-party application 108, e.g., via a secure, programmatic interface (not illustrated in FIG. 4A).

Alternatively, if executed consent detection module 310 were to establish that user 101 granted executed third-party application 108 access to the requested elements of raw transaction data, executed consent detection module 310 may perform further operations that determine an extent to which user 101 also granted executed third-party application 108 permission to distribute all or a portion of the requested elements of confidential transaction data to additional, unrelated computing systems operating within environment 100, or to applications programs executed by the these additional computing systems, e.g., fourth- and fifth-party applications. For example, as illustrated in FIG. 4A, executed consent detection module 310 may parse consent document 244 to identify and access permissioning data 414, which may specify one or more limitations or restrictions on an ability of executed third-party application 108 to distribute the requested elements of confidential transaction data to the additional, unrelated computing systems or executed application programs.

In some instances, and based permissioning data 414, executed consent detection module 310 may determine that user 101 imposed no limitations or restrictions on the ability of executed third-party application 108 to distribute the requested elements of confidential transaction data to the additional, unrelated computing systems or executed application programs. Based on the determination that executed third-party application 108 may freely distribute the requested elements of confidential transaction data, executed access management widget 110 may perform operations (not illustrated in FIG. 4A) that access the one or more encrypted elements of confidential data 404 maintained within container memory 114, and that decrypt each of the encrypted elements of confidential data 404 using corresponding private cryptographic key, e.g., maintained within container memory 114. Further, although not illustrated in FIG. 4A, executed access management widget 110 may also extract the requested elements of the confidential transaction data from the newly decrypted elements of confidential data, and provide the requested elements of the confidential transaction data to executed third-party application 108 via a secure, programmatic interface.

In other instances, and based on an analysis of permissioning data 414, executed consent detection module 310 may establish that user 101 denied executed third-party application 108 permission to distribute the requested elements of confidential data to any of the additional, unrelated computing systems or executed applications or alternatively, to a selected subset of the additional, unrelated computing systems or executed applications. In response to the established denial of permission by user 101, executed consent detection module 310 may provide information 406 as an input to a data security engine 416 of executed access management widget 110, which when executed by client device 102, may perform any of the exemplary processes described herein to decrypt the encrypted elements of confidential data 404, extract the requested elements of confidential transaction from the newly decrypted confidential data, and digitally modify selected portions of the requested elements of confidential data prior to distribution to third-party application 108, e.g., alone or in conjunction with one or more of peer systems 180.

By way of example, an extraction module 418 of executed data security engine 416 may receive information 406, and may perform operation that decrypt of the encrypted elements of confidential data 404 using a private cryptographic key of access management widget 110. Based on portions of information 406 (which identifies the requested elements of confidential transaction data), executed extraction module 418 may parse the newly-decrypted elements of confidential data to extracted the requested elements of confidential data, e.g., as requested transaction data 420. As described herein, requested transaction data 420 may include raw elements of transaction data characterizing the thirty, most-recent purchase transactions involving the credit card held by user 101, and executed extraction module 418 may route requested transaction data 420 to a digital watermarking module 422 of executed data security engine 416. When executed by client device 102, digital watermarking module 422 may perform operations that apply one or more digital watermarks to selected portions of requested transaction data 420.

In one example, illustrated in FIG. 4A, executed digital watermarking module 422 may access a local copy of distributed ledger 186, e.g., as maintained securely within container memory 114, and parse one or more elements of distributed ledger 186 to access rubric data 424 that specifies one or more candidate rubrics for applying the one or more digital watermarks to the selected portions of requested transaction data. In other instances, not illustrated in FIG. 4A, executed access management widget 110 may maintain all or a portion of rubric data 424 within one or more memories inaccessible to, and isolated from, executed third-party application 108, e.g., within a portion of container memory 114.

In some instances, each of the candidate rubrics may identify and characterize one or more digital modifications to specified portions of confidential data, which when implemented by executed digital watermarking module 422, apply a corresponding digital watermark to the confidential data. Further, each of the candidate rubrics within rubric data 424 may be established by a centralized authority, such as, but not limited to, a regulatory, governmental, or legal entity, or a consortium or industry group of financial institutions or related entities, and a computing system operated by corresponding ones of the centralized authorities may generate data identifying and characterizing corresponding ones of the candidate rubrics, and broadcast the generated data across network 170 to one or more of peer systems 180, which may perform consensus-based operations that record the generated data onto the distributed ledger, e.g., within rubric data 424.

In some instances, one or more of the candidate rubrics may be associated with a particular type of third-party application (e.g., a financial aggregation application, a financial management application, etc.), with a particular type or class of third party (e.g., a financial institution, an unrelated business entity, etc.), with a risk level that characterizes the third party or the third-party application (e.g., a high, medium, or low risk, etc.), with a particular class of requested confidential data (e.g., confidential profile, account, or transaction data, etc.), and additionally or alternatively, with a particular element of requested confidential data (e.g., an account balance, a government-issued identifier, etc.). Executed digital watermarking module 422 may select, from rubric data 424, a candidate rubric 426 that is appropriate to the third-party application 108, the requested elements of confidential transaction data (e.g., that characterize the thirty most-recent purchase transactions involving the credit card account held by user 101), and in some instances, a level of risk that characterizes third-party application 108.

Executed digital watermarking module 422 may perform operations that digitally modify selected portions of requested transaction data 420 in accordance with candidate rubric 426 (e.g., to apply a corresponding one of the digital watermarks), and output modified transaction data 428, which executed access management widget 110 may provide to executed third-party application 108, e.g., through a secure, programmatic interface, such as API 430 established and maintained by executed request management module 301. In some instances, the corresponding one of the digital watermarks applied by executed digital watermarking module 422 to requested transaction data 420 (e.g., as established within modified transaction data 428) may be invisible and undetectable by executed third-party application 108, the one or more additional computing systems, or the application programs executed by the additional computing systems (e.g., the fourth- and fifth-party applications, etc.), but may be recognizable by a computing system operated by a centralized authority, such as, but not limited to, a regulatory, governmental, or legal entity, or a consortium or industry group of financial institutions or related entities. For example, the applied digital watermark may enable the computing system operated by the centralized authority to identify and track those raw elements of confidential data provisioned to third-party application 108 in an instance of a subsequent breach or subsequent misuse of the raw elements of confidential data.

In other examples, executed digital watermarking module 422 may modify requested transaction data 420 not on the basis of locally maintained rubric data or rubric data recorded onto a locally maintained distributed ledger, but instead based on an execution of a distributed smart contract recorded immutably within distributed ledger 186, e.g., in conjunction with one or more of peer systems 180. For example, and referring to FIG. 4B, executed digital watermarking module 422 may receive requested transaction data 420, and may perform operations that encrypt requested transaction data 420 using a public cryptographic key of the distributed smart contract, e.g., to generate encrypted transaction data 434. Further, executed digital watermarking module 422 may package encrypted transaction data 434 and one or more elements of application data 436 into corresponding portions of a watermarking request 437. In some instances, application data 436 may include, but is not limited to, an application type associated with third-party application 108, information identifying or characterizing the third-party entity that developed third-party application 108 and additionally, or alternatively, a risk level associated with third-party application 108.

Further, executed digital watermarking module 422 may also perform operations that apply a digital signature 438 to encrypted transaction data 434 and to application data 436 using any appropriate digital signature algorithm using a private cryptographic key of access management widget 110. Executed digital watermarking module 422 may also package, into watermarking request 437, digital signature 438, a public key certificate 440 of access management widget 110 (e.g., that include a public cryptographic key of access management widget 110), and a unique contract identifier 442 of the distributed smart contract. Executed access management widget 110 may perform further operations that broadcast watermarking request 437 across network 120 to the one or more peer systems 180, including peer system 182.

Each of peer systems 180, including peer system 182, may receive watermarking request 437 through a secure, programmatic interface, and may parse watermarking request 437 to detect contract identifier 442. By way of example, upon detection of the contract identifier, peer system 182 (and each additional or alternate one of peer systems 180) may access elements of executable code recorded onto distributed ledger 186, e.g., within smart contract ledger blocks 444. In some instances, smart contract ledger blocks 444 may include a distributed digital watermarking module 446 that, when executed by each of peer systems 180, including peer system 182 (e.g., by one or more processors or through an instantiated virtual machine), performs operations that verify digital signature 438, e.g., based on the public cryptographic key extracted from public key certificate 440, that extract encrypted transaction data 434 and application data 436 from watermarking request 437, and that decrypt encrypted transaction data 434 using a private cryptographic key of the distributed smart contract.

Further, when executed by each of peer systems 180, including peer system 182, distributed digital watermarking module 446 may also access rubric data 448, as maintained within one or more tangible, non-transitory memories (e.g., within data repository 184 maintained by peer system 182), and may perform any of the exemplary processes described herein to select a candidate rubric 450 that is consistent with the newly decrypted transaction data and with the application type, the information identifying or characterizing the third-party entity, and additionally, or alternatively, the risk level associated with third-party application 108, as specified within application data 436. In some instances, executed distributed digital watermarking module 446 may also perform any of the exemplary processes described herein to digitally modify selected portions of the decrypted transaction data in accordance with candidate rubric 450 (e.g., to apply a corresponding one of the digital watermarks), to encrypt the modified transaction data using a public cryptographic key of access management widget 110, and to output encrypted modified transaction data 452, e.g., for inclusion within a watermarking response 454.

Further, when executed by each of peer systems 180, including peer system 182, distributed digital watermarking module 446 may also apply a digital signature 456 to encrypted modified transaction data 452 using any appropriate digital signature algorithm using a private cryptographic key of the distributed smart contract, and that package digital signature 456 and a public key certificate 458 of the distributed smart contract (e.g., that includes a public cryptographic key of the distributed smart contract) into watermarking response 454. Based on an outcome of the consensus-based processing, one of peer systems 180, such as peer system 182, may transmit watermarking response 454 across network 120 to client device 102.

A secure, programmatic interface associated with executed access management widget 110, such as application programming interface (API) 460, may receive and route watermarking response 454 to a local provisioning module 462 of executed access management widget 110, which may perform operations that validate digital signature 456 (e.g., based on the public cryptographic key of the distributed smart contract extracted from public key certificate 458), decrypt each element of encrypted modified transaction data 452 to output modified transaction data 466. As illustrated in FIG. 4B, executed local provisioning module 462 may perform operations that cause executed access management widget 110 to provide modified transaction data 466 to executed third-party application 108, e.g., through a secure, programmatic interface, such as API 430 established and maintained by executed request management module 301

In some instances, the digital watermarks applied by executed distributed to the decrypted elements of the transaction data (e.g., as established within modified transaction data 466) may be invisible and undetectable by executed third-party application 108, the one or more additional computing systems, or the application programs executed by the additional computing systems (e.g., the fourth- and fifth-party applications, etc.), but may be recognizable by the computing system operated by a centralized authority, such as, but not limited to, a regulatory, governmental, or legal entity, or a consortium or industry group of financial institutions or related entities. As described herein, the applied digital watermark may enable the computing system operated by the centralized authority to identify and track those raw elements of confidential data provisioned to third-party application 108 in an instance of a subsequent breach or subsequent misuse of the raw elements of confidential data third-party applications.

Figure 5:
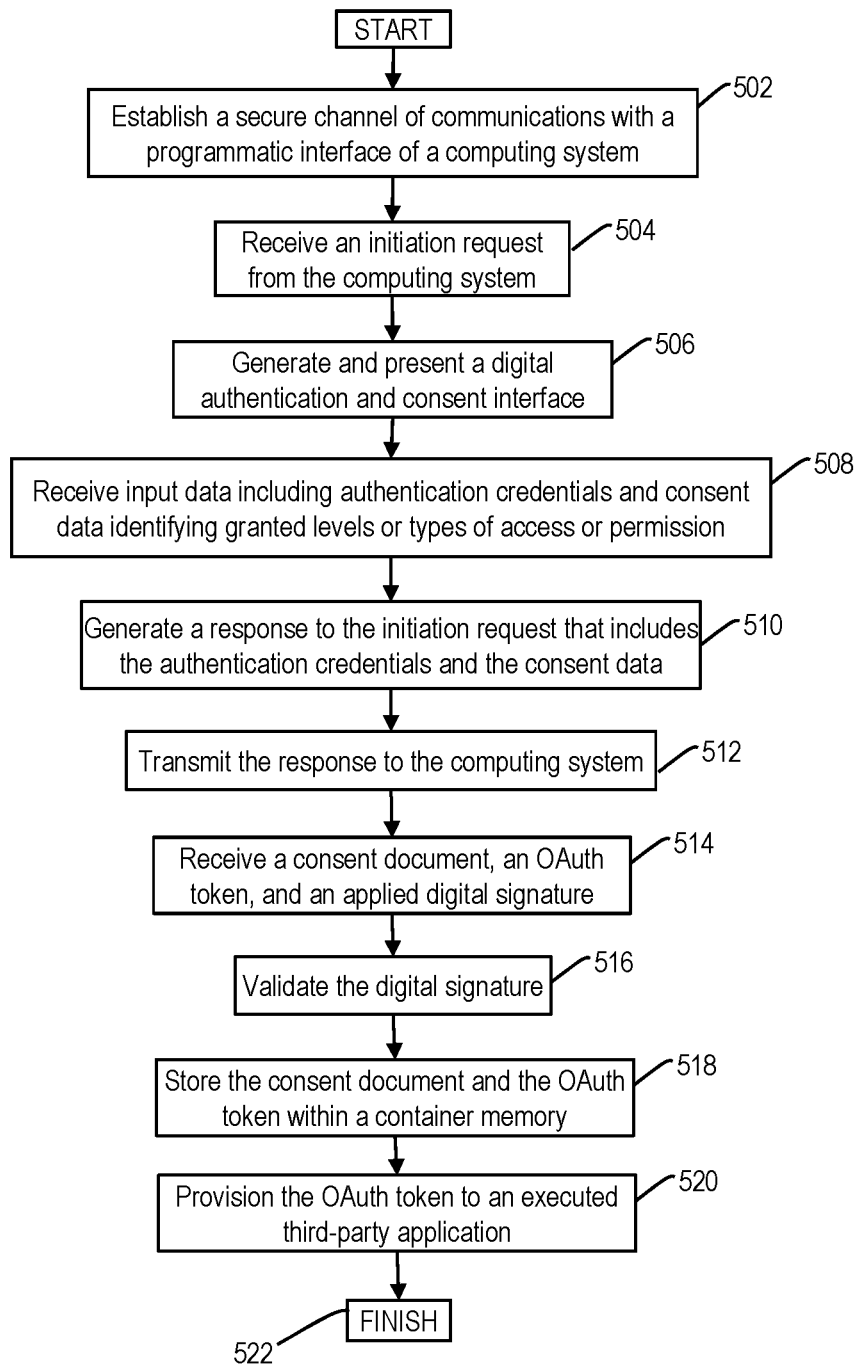
FIGS. 5-7 are flowcharts of exemplary processes for dynamically managing consent and permissioning protocols using a container-based application, in accordance with some embodiments.

FIG. 5 is a flowchart of an exemplary process 500 for dynamically managing consent and permissioning protocols using a container-based application, in accordance with disclosed exemplary embodiments. In some instances, a network-connected device operating within environment 100, such as client device 102, may perform one or more of the steps of exemplary process 500, e.g., upon execution of a contained-based application, such as access management widget 110, deployed to client device 102 by a network connected computing system that maintains confidential elements of profile, account, or transaction data on behalf of one or more users, such as user 101. In some instances, access management widget 110 may be configured to operate in conjunction with a third-party application provisioned to client device 102, e.g., third-party application 108, which may trigger an execution of access management widget through one or more programmatically generated comments.

Referring to FIG. 5, executed access management widget 110 may perform operations cause client device 102 to establish a secure channel of communications with a programmatic interface established and maintained by computing system 130 (e.g., in step 502). In some instances, and responsive to the establishment of the secure communications channel, executed access management widget 110 may perform operations that, in conjunction with one or more applications programs executed by computing system 130, initiate and implement one or more of the exemplary token-based authentication and consent protocols described herein, which collectively authenticate an identity of user 101, establish a level or type of access granted by user 101, and further, generate a digital token, cryptogram, hash value, or other element of cryptographic data (e.g., an OAuth token) indicative of the successful authentication and a consent document that identifies and characterizes the granted type or level of access.

For example, client device 102 may receive a request to initiate a token-based authentication and consent process from computing system 130 (e.g., in step 504). As described herein, the request may include one or more unique identifiers of computing system 130 (e.g., an assigned internet protocol (IP) address, etc.) or an application program executed by computing system 130 (e.g., a cryptogram, hash value, or other element of cryptographic data that uniquely identifies authorization engine 142 to executed access management widget 110). The received request may also include information identify certain types or classes of confidential data maintained on behalf of user 101 by computing system 130 (e.g., confidential profile, account, or transaction data), along with certain data elements associated with one or more of the confidential profile, account, or transaction data.

In some instances, executed access management widget 110 of client device 102 may process the received request, and may perform any of the exemplary processes described herein to generate and present a digital authentication and consent interface to user 101 (e.g., in step 506). The digital authentication and consent interface may, for example, include interface elements that prompt user 101 to provide input to client device 102 specifying whether user 101 grants access management widget 110 permission to access, on behalf of third-party application 108, certain types or classes of the confidential data maintained by computing system 130. The digital authentication and consent interface may also include interface elements that prompt user 101 to provide, to client device 102, input that specifies whether user 101 grants or denies permission for third-party application 108, or for access management widget 110 acting on behalf of third-party application 108, to perform one or more operations on the certain types or classes of the confidential data maintained by computing system 130. Further, in some instances, the digital authentication and consent interface may also include additional interface elements that, when selected by user 101, confirm the granted (or denied) access or permission and enable user 101 to provide one or more authentication credentials that uniquely identify user 101 to computing system 130.

In step 508, executed access management widget of client device 102 may receive, via input unit 116B, input data that includes the one or more authentication credentials and information that identifies a level or type of access or permission granted by user 101. Executed access management widget of client device 102 may package the extracted information into corresponding portions of consent data, and may perform any of the exemplary processes described herein to generate a response to the received request that includes the authentication credentials and the consent data (e.g., in step 510), and to transmit the generated response to computing system 130 via the secure, programmatic interface (e.g., in step 512). In some instances, the response generated in step 510 may also include a unique identifier of executed access management widget 110 (e.g., a unique cryptogram, hash value, or other element of cryptographic data, etc.) and a unique identifier of client device 102 (e.g., an IP address etc.), which may enable computing system 130 to verify that executed access management widget 110 represents a valid, container-based widget developed and provisioned to client device 102.

In some instances, and based on the generated response, computing system 130 may perform any of the exemplary processes described herein to authenticate the identity of user 101 (e.g., based on the authentication credentials included within the generated response) and to determine a level or type of access granted to third-party application 108, either alone or through access management widget 110, by user 101 (e.g., based on the credential data within the generated response). Further, and using any of the exemplary processes described herein, computing system 130 may generate a digital token, cryptogram, hash value, or other element of cryptographic data, e.g., an OAuth token, indicative of the successful authentication, and a consent document that identifies and characterize a level or type of access granted to third-party application 108 to access elements of confidential data via access management widget 110, and a grant or denial of a permission for third-party application 108, or access management widget 110 on behalf of third-party application 108, to perform one or more operations on the elements of confidential data.

Further, computing system 130 may perform any of the exemplary processes described herein to apply a digital signature to the consent document (and in some instances, to the OAuth token), e.g., using any appropriate digital signature algorithm in conjunction with a private cryptographic key of computing system 130. Computing system 130 may also perform operations that transmit the consent document and the OAuth token, along with the digital signature and a public key certificate of computing system 130 (e.g., that includes a corresponding public cryptographic key), across network 170 to client device 102, e.g., via a secure, programmatic interface of executed access management widget 110.

Referring back to FIG. 5, executed access management widget 110 of client device 102 may receive the consent document, the OAuth token, the digital signature, and the public key certificate of computing system 130 (e.g., in step 514) and may perform any of the exemplary processes described herein to validate the digital signature based on the public cryptographic key of computing system 130 included within the public key certificate (e.g., in step 516). Responsive to the validation of the digital signature, executed access management widget 110 of client device 102 may store the consent document and the OAuth token within corresponding portions of a container memory that is isolated from and inaccessible to third-party application 109, either alone or in conjunction with the public key certificate (e.g., in step 518).

In step 520, executed access management widget 110 of client device 102 may perform further operations that provide the OAuth token as an input to executed third-party application 108, e.g., via a secure programmatic interface. In some instances, executed third-party application 108 may perform operations that store the OAuth token within a corresponding potion of an accessible memory, e.g., alone or in conjunction with additional data that identifies computing system 130 and that establishes an association between the OAuth token and computing system 130. Exemplary process 500 is then complete in step 522.

Figure 6:
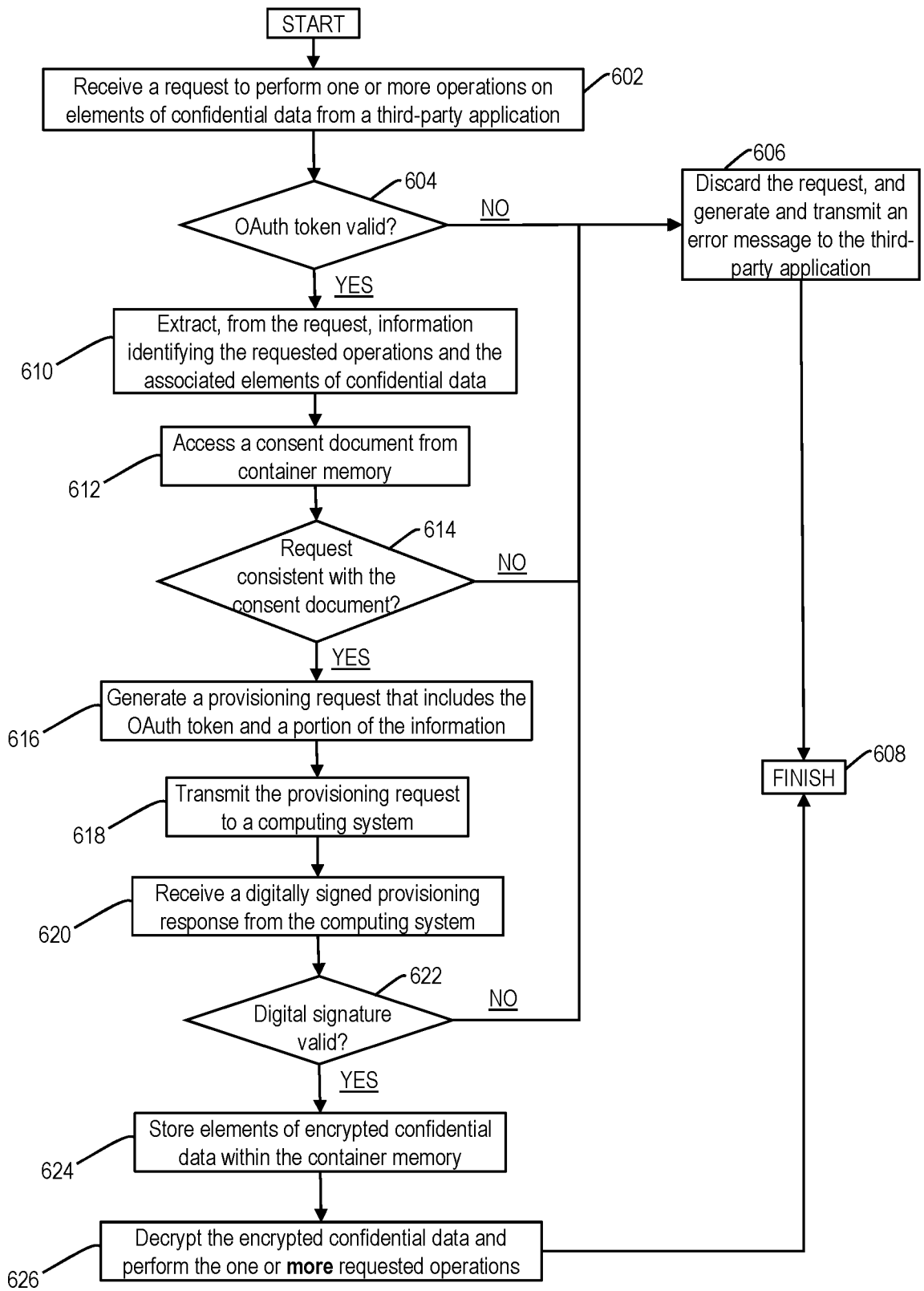

FIG. 6 is a flowchart of an exemplary process 600 for dynamically managing consent and permissioning protocols using a container-based application, in accordance with disclosed exemplary embodiments. In some instances, a network-connected device operating within environment 100, such as client device 102, may perform one or more of the steps of exemplary process 600, e.g., upon execution of a contained-based application, such as access management widget 110, deployed to client device 102 by a network connected computing system that maintains confidential elements of profile, account, or transaction data on behalf of one or more users, such as user 101. In some instances, access management widget 110 may be configured to operate in conjunction with a third-party application provisioned to client device 102, e.g., third-party application 108, which may trigger an execution of access management widget through one or more programmatically generated comments.

Referring to FIG. 6, executed access management widget 110 of client device 102 may receive a request, from third-party application 108, to perform one or more operations on elements of confidential data maintained on behalf of user 101 by one or more network-connected computing systems within environment 100, such as the elements of confidential profile, account, and transaction data maintained by computing system 130 (e.g., in step 602). For example, the received request may include a digital token, cryptogram, hash value, or other element of cryptographic data (e.g., an OAuth token) indicative of an authentication of an identity of user 101 by computing system 130, along with information that identifies of each of the one or more requested operations and each of the elements of confidential data associated with the one or more requested operations.

In some instances, executed access management widget 110 of client device 102 may access and extract the OAuth token from the received request, and perform any of the exemplary processes described herein to validate the extracted OAuth token based on a comparison with a local OAuth token maintained within a container memory inaccessible to third-party application 108 (e.g., in step 604). For example, if executed access management widget 110 were to detect an inconsistency between the extracted OAuth token the locally maintained OAuth token (e.g., step 604; NO), executed access management widget 110 may discard the received request, and may and generate and transmit an error message to third-party application 108 (e.g., in step 606). Exemplary process 600 is then complete in step 608.

In other instances, if executed access management widget 110 were to determine that the extracted OAuth token corresponds to or matches the locally maintained OAuth token (e.g., step 604; YES), executed access management widget 110 may validate the extracted OAuth token and the received request. Executed access management widget 110 may perform additional operations that extract, from the received request, the information identifying the requested operations and the associated elements of confidential data (e.g., in step 610), and may access a consent document maintained locally within the container memory (e.g., in step 612). As described herein, the consent document may identify and characterize a type or level of access granted to third-party application 108, or granted to access management widget 110 on behalf of third-party application 108, by user 101 through any of the exemplary processes described herein.

Further, and based on a comparison between the consent document and operational and portions of the extracted information, executed access management widget 110 may perform any of the exemplary processes described herein to determine whether each of the one or more requested operations, and the associated access elements of confidential data, are consistent with the level or type of access to previously granted by user 101 (e.g., in step 614). If, for example, executed access management widget 110 were to detect an inconsistency between the previously granted level or type of access (e.g., as specified within the consent document) and either the one or more requested operations or the associated elements of confidential data (e.g., step 614; NO), executed access management widget 110 may determine that the received request is inconsistent with the consent document. Exemplary process 600 may pass back to step 606, and executed access management widget 110 may generate and transmit an error message to executed third-party application 108, e.g., via a secure, programmatic interface. Exemplary process 600 is then complete in step 608.

Alternatively, if executed access management widget 110 were to establish a consistency between the level or type of access previously granted by user 101 and each of the requested operations and associated elements of confidential data (e.g., step 614; YES), executed access management widget 110 may perform any of the exemplary processes described herein to generate a provisioning request that includes the OAuth token and all or a portion of the extracted information, along with a unique identifier of executed access management widget 110 and a unique identifier of client device 102 (e.g., in step 616), and to transmit the generated provisioning request to computing system 130 across such as network 170, e.g., via a secure, programmatic interface (e.g., in step 618).

In some instances, and based on the received provisioning request, computing system 130 may perform any of the exemplary processes described herein to determine that executed access management widget 110 represents a valid, container-based widget developed and provisioned to client device 102 by computing system 130, e.g., based on the unique identifiers of access management widget 110 and client device 102. Executed access management widget 110 may also perform any of the exemplary processes described herein to extract the OAuth token from the provisioning request, and to validate the extracted OAuth token based on a comparison of a locally maintained copy of the OAuth token. Based on the determination that access management widget 110 represents a valid, container-based widget, and on the validation of the OAuth token, computing system 130 may perform any of the exemplary processes described herein to identify and extract, from one or more data repositories (e.g., from confidential data store 136 of FIG. 1), one or more elements of confidential data that correspond to the elements of confidential data associated with the operations requested by third-party application 108, as described herein.

In some instances, computing system 130 may encrypt each of the elements of confidential data using, for example, a public cryptographic key of access management widget 110, and may output elements of encrypted confidential data. Further, computing system 130 may also perform operations that apply a digital signature to the elements of encrypted confidential data, e.g., using any appropriate digital signature algorithm in conjunction with a private cryptographic key of computing system 130, and computing system 130 may perform any of the exemplary processes described herein to generate a provisioning response that includes the elements of encrypted confidential data, the applied digital signature, and a public key certificate of computing system 130 (e.g., that includes a corresponding public cryptographic key). Computing system 130 may transmit the provisioning response across network 170 to client device 102 using any appropriate communications protocol.

Referring back to FIG. 6, and in step 620, a secure, programmatic interface of executed access management widget 110 may receive the provisioning response (e.g., on behalf of executed third-party application 108). In some instances, executed access management widget 110 may parse the provisioning response to extract the digital signature and the public key certificate, and may perform operations that validate the digital signature based on the public cryptographic key of computing system 130 included within the public key certificate (e.g., in step 622). If, for example, executed access management widget 110 were unable to validate the digital signature (e.g., step 622; NO), executed access management widget 110 may determine that at least a portion of the provisioning response was corrupted during transmission or was modified by an unauthorized third party. In some instances, exemplary process 600 may pass back to step 606, and executed access management widget 110 may discard the request (and the provisioning response), and generate and transmit an error message to third-party application 108. Exemplary process 600 is then complete in step 608.

In other examples, and responsive to the validation of the digital signature (e.g., step 622; YES), executed access management widget 110 perform operations that store the elements of encrypted confidential data within a corresponding portion of container memory 114, which is inaccessible to third-party application 108 (e.g., in step 624). Executed access management widget 110 may perform any of the exemplary processes described herein to decrypt the elements of encrypted confidential data, and to perform the one or more requested operations on the decrypted elements of confidential data (e.g., in step 626). As described, the one or more requested operations may be specified within the operational identifiers included within the provisioning request, and are consistent with the level or type of access previously granted by user 101 (e.g., as specified within the consent document). Exemplary process 600 is then complete in step 608.

Figure 7:
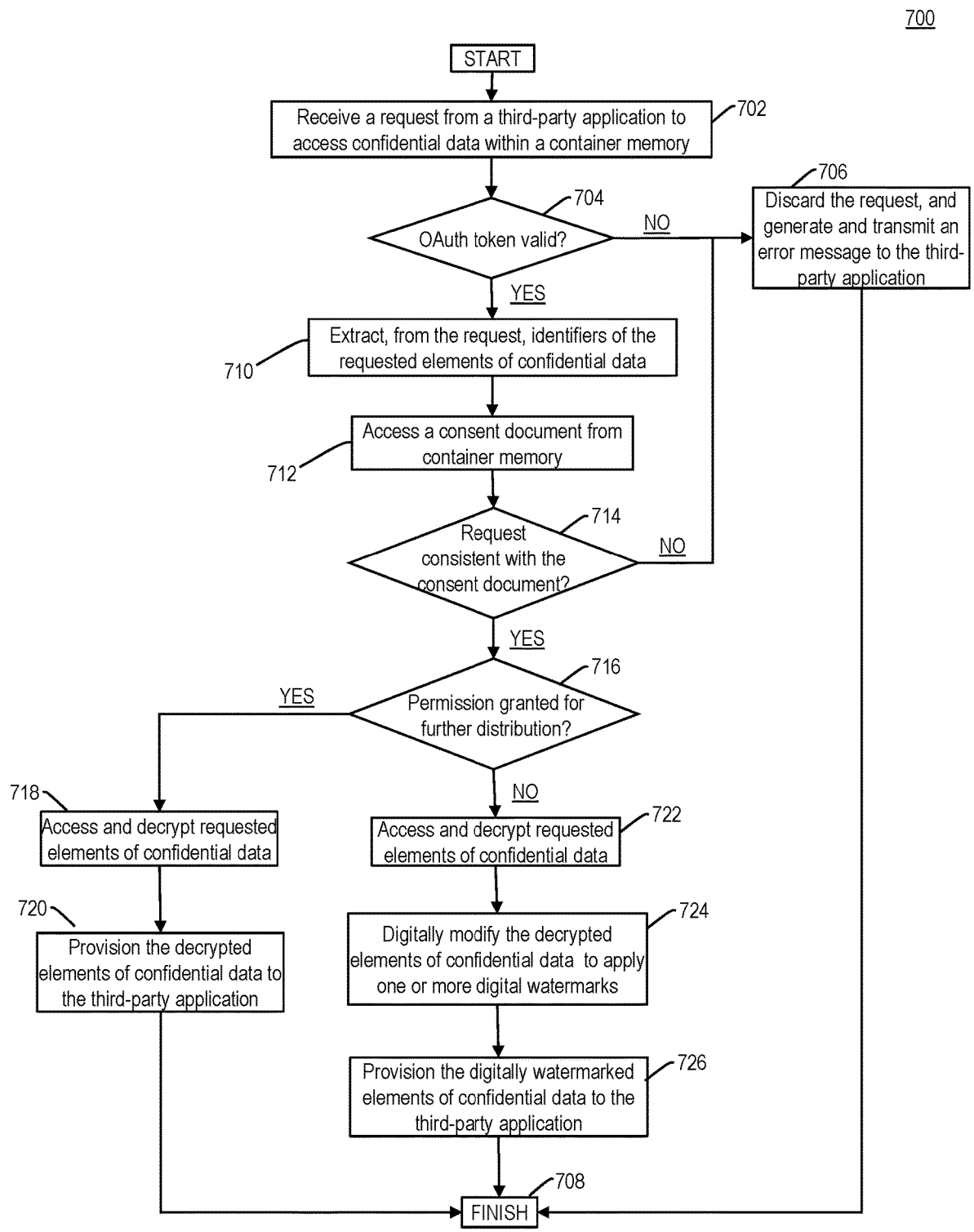

FIG. 7 is a flowchart of an exemplary process 600 for dynamically managing consent and permissioning processes using a container-based application, in accordance with disclosed exemplary embodiments. In some instances, a network-connected device operating within environment 100, such as client device 102, may perform one or more of the steps of exemplary process 700, e.g., upon execution of a contained-based application, such as access management widget 110, deployed to client device 102 by a network connected computing system that maintains confidential elements of profile, account, or transaction data on behalf of one or more users, such as user 101. In some instances, access management widget 110 may be configured to operate in conjunction with a third-party application provisioned to client device 102, e.g., third-party application 108, which may trigger an execution of access management widget through one or more programmatically generated comments.

Referring to FIG. 7, executed access management widget 110 of client device 102 may receive a request, from third-party application 108, to access one or more elements of raw confidential data maintained within a container memory by executed access management widget 110 (e.g., in step 702). For example, and as described herein, the received request may include a digital token, cryptogram, hash value, or other element of cryptographic data (e.g., an OAuth token) indicative of an authentication of an identity of user 101 by computing system 130, along with an identifier of each of the requested elements of confidential data.

In some instances, executed access management widget 110 may access and extract the OAuth token from the received request, and perform any of the exemplary processes described herein to validate the extracted OAuth token (e.g., in step 704). For example, if executed access management widget 110 were to detect an inconsistency between the extracted OAuth token a locally maintained OAuth token (e.g., step 604; NO), executed access management widget 110 may decline to validate the extracted OAuth token, and may discard the received request and generate and transmit an error message to third-party application 108 (e.g., in step 706). Exemplary process 600 is then complete in step 608.

In other instances, if executed access management widget 110 were to determine that the extracted OAuth token corresponds to or matches the locally maintained OAuth token (e.g., step 704; YES), executed access management widget 110 may validate the extracted OAuth token and the received request. Executed access management widget 110 may perform additional operations that extract the identifiers of the requested elements of confidential data (e.g., in step 710), and may access consent document maintained locally within the container memory (e.g., in step 712). As described herein, the consent document may identify and characterize a type or level of access granted to third-party application 108, or granted to access management widget 110 on behalf of third-party application 108, by user 101 through any of the exemplary processes described herein.

In some instances, executed access management widget 110 may perform any of the exemplary processes described herein to determine whether the access requested by third-party application 108 is consistent with the level or type of access previously granted by user 101 (e.g., in step 714). For example, and based on portions of the consent document, executed access management widget 110 may determine that user 101 denied third-party application 108 access to any of the requested elements of confidential data (e.g., step 710; NO). In response to this determination, exemplary process 700 may pass back to step 706, and executed access management widget 110 may generate and transmit an error message to executed third-party application 108.

Alternatively, if executed access management widget 110 were to establish that user 101 granted executed third-party application 108 access to the requested elements of raw transaction data (e.g., step 714; YES), executed access management widget 110 may perform any of the exemplary processes described herein to determine whether user 101 also granted executed third-party application 108 permission to distribute all or a portion of the requested elements of confidential data to additional, unrelated computing systems operating within environment 100, or to unrelated applications programs executed by the these additional computing systems, e.g., fourth- and fifth-party applications (e.g., in step 716).

If, for example, executed access management widget 110 were to determine that user 101 imposed no limitations or restrictions on the ability of executed third-party application 108 to distribute the requested elements of confidential transaction data (e.g., step 716; YES), executed access management widget 110 may perform operations that access one or more encrypted elements of confidential data maintained within the container memory 114, and that decrypt each of the encrypted elements of confidential data using corresponding private cryptographic key (e.g., in step 718). Executed access management widget 110 may provide the requested, and newly decrypted, elements of the confidential transaction data to executed third-party application 108, via a secure, programmatic interface (e.g., in step 720). Exemplary process 700 is then complete in step 708.

In other instances, if executed access management widget 110 were to determine that user 101 denied third-party application 108 permission to distribute the requested elements of confidential data to any of the additional, unrelated computing systems or executed applications or alternatively, to a selected subset of the additional, unrelated computing systems or executed applications (e.g., step 716; NO), executed access management widget 110 may decrypt the encrypted elements of confidential data maintained within the container memory, and extract the requested elements of confidential transaction from the newly decrypted confidential data (e.g., in step 722). Further, in step 724, executed access management widget 110 may perform any of the exemplary processes described herein to digitally modify selected portions of the requested elements of confidential data prior to distribution to third-party application 108, e.g., to apply a one or more digital watermarks to the requested elements of confidential data. Executed access management widget 110 may provide the digitally modified elements of confidential data, which include the one or more applied digital watermarks, to executed third-party application 108, via a secure, programmatic interface (e.g., in step 726). Exemplary process 700 is then complete in step 708.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, third-party application 108, access management widget 110, application programs 140, authorization engine 142, validation engine 144, APIs 204, 208, 316, and 430, local authorization and consent module 210, validation module 238, consent management module 242, local validation module 256, request management module 301, consent detection module 310, extraction module 318, provisioning module 322, data processing module 336, operations module 339, extraction module 418, digital watermarking module 422, distributed digital watermarking module 446, and local provisioning module 462 can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A device, comprising:
a communications interface;
a memory storing instructions; and
at least one processor coupled to the communications interface and to the memory, the at least one processor being configured to execute the instructions to:
receive a request for an element of data from an application program executed by the at least one processor, the request being generated by the executed application program, and the request comprising a first digital token associated with the executed application program;
load a second digital token from a portion of the memory that is inaccessible to the executed application program; and
when the first digital token is consistent with the second digital token, and when the request is consistent with a level or type of access granted to the executed application program, obtain the data element and a digital signature applied to the data element, and based on a verification of the digital signature, perform operations that present a representation of the data element within a digital interface, the digital interface comprising an interface element that confirms the verification of the digital signature, and the interface element comprising at least one of an icon, a glyph, or a digital image.

2. The device of claim 1, wherein:
the device further comprises a display unit coupled to the at least one processor; and
the at least one processor is further configured to present, via the display unit, the representation of the data element within the digital interface, when the first digital token is consistent with the second digital token, and when the request is consistent with the level or type of access granted to the executed application program.

3. The device of claim 1, wherein
the at least one processor is further configured to execute the instructions to verify the applied digital signature using a public cryptographic key associated with the device.

4. The device of claim 1, wherein:
the first digital token is maintained within a portion of the memory that is accessible to the executed application program; and
the at least one processor is further configured to execute the instructions to receive the request from the executed application program through a programmatic interface.

5. The device of claim 1, wherein the at least one processor is further configured to execute the instructions to:
determine that the first digital token is consistent with the second digital token;
load consent data from an additional portion of the memory that is inaccessible to the executed application program, the consent data specifying the level or type of access granted to the executed application program; and
based on the consent data, determine that the request is consistent with the level or type of access granted to the executed application program.

6. The device of claim 1, wherein:
the request comprises an identifier of an operation involving the data element; and
the at least one processor is further configured to execute the instructions to:
when the first digital token is consistent with the second digital token, obtain consent data specifying the level or type of access granted to the executed application program;
based on the identifier and the consent data, determine that a performance of the operation is consistent with the level or type of access granted to the executed application program; and
perform the operation involving the data element in accordance with the request.

7. The device of claim 6, wherein the operation comprises the presentation of the representation of the data element within the digital interface.

8. The device of claim 6, wherein:
the operation comprises provisioning the data element to the executed application program; and
the at least one processor is further configured to execute the instructions to:
based on the identifier and the consent data, determine that the executed application program (i) is permitted to access the data element and (ii) is not permitted to distribute the data element to at least one of an additional computing system or an additional executed application program;

perform operations that modify the data element in accordance with rubric data established by a centralized authority; and provision the modified data element to the executed application program through a programmatic interface.

9. The device of claim 1, wherein the at least one processor is further configured to execute the instructions to, when the first digital token is consistent with the second digital token and when the request is consistent with the level or type of access granted to the executed application program, obtain the data element from at least one of a computing system or an additional portion of the memory inaccessible to the executed application program.

10. A computer-implemented method, comprising:

receiving, using at least one processor, a request for an element of data, the request being generated by an application program executed by the at least one processor, and the request comprising a first digital token associated with the executed application program;

loading, using the at least one processor, a second digital token from a portion of a data repository that is inaccessible to the executed application program; and when the first digital token is consistent with the second digital token, and when the request is consistent with a level or type of access granted to the executed application program, obtaining the data element and a digital signature applied to the data element using the at least one processor, and based on a verification of the digital signature, performing operations, using the at least one processor, that present a representation of the data element within a digital interface, the digital interface comprising an interface element that confirms the verification of the digital signature, and the interface element comprising at least one of an icon, a glyph, or a digital image.

11. A device, comprising:

a communications interface;

a memory storing instructions; and at least one processor coupled to the communications interface and to the memory, the at least one processor being configured to execute the instructions to:

receive, from an application program executed by the at least one processor, a request to perform an operation involving an element of data, the request being generated by the executed application program, and the request comprising a first digital token associated with the executed application program and an identifier of the operation;

load a second digital token from a portion of the memory that is inaccessible to the executed application program; and when the first digital token is consistent with the second digital token, and when the operation is consistent with a level or type of access granted to the executed application program, obtain the data element and a digital signature applied to the data element, and based on a verification of the digital signature, perform the operation involving the data element and present an interface element that confirms the verification of the digital signature within a digital interface, and the interface element comprising at least one of an icon, a glyph, or a digital image.

12. The device of claim 11, wherein:

the first digital token is maintained within a portion of the memory that is accessible to the executed application program; and the at least one processor is further configured to execute the instructions to receive the request from the executed application program through a programmatic interface.

13. The device of claim 11, wherein the at least one processor is further configured to execute the instructions to:

determine that the first digital token is consistent with the second digital token;

load consent data from an additional portion of the memory that is inaccessible to the executed application program, the consent data specifying the level or type of access granted to the executed application program; and based on the consent data and on the identifier, determine that the operation is consistent with the level or type of access granted to the executed application program.

14. The device of claim 11, wherein the at least one processor is further configured to:

based on a verification of the applied digital signature, store the data element within an additional portion of the memory that is inaccessible to the executed application program.

15. The device of claim 11, wherein:

the operation comprises presenting a representation of the data element within the digital interface; and the at least one processor is further configured to execute the instructions to:

load consent data from an additional portion of the memory that is inaccessible to the executed application program, the consent data specifying the level or type of access granted to the executed application program;

based on the consent data and on the identifier, determine that the presentation of the representation of the data element within the digital interface is consistent with the level or type of access granted to the executed application program; and perform operations that generate the representation of the data element and present the representation within the digital interface.

16. The device of claim 15, wherein the at least one processor is further configured to execute the instructions to verify the digital signature applied to the data element using a public cryptographic key associated with the device; and.

17. The device of claim 11, wherein:

the operation comprises provisioning the data element to the executed application program; and the at least one processor is further configured to execute the instructions to:

load consent data from an additional portion of the memory that is inaccessible to the executed application program, the consent data specifying the level or type of access granted to the executed application program;

based on the consent data and on the identifier, determine that the provisioning of the data element to the executed application program is consistent with the level or type of access granted to the executed application program; and perform operations that provision the data element to the executed application program through a programmatic interface.

18. The device of claim 17, wherein the at least one processor is further configured to execute the instructions to:
- based on the identifier and the consent data, determine that the executed application program (i) is permitted to access the data element and (ii) is not permitted to distribute the data element to at least one of an additional computing system or an additional executed application program;
- perform operations that modify at least a portion of the data element in accordance with rubric data established by a centralized authority; and
- provision the modified data element to the executed application program through the programmatic interface.

19. The device of claim 11, wherein the at least one processor is further configured to execute the instructions to, when the first digital token is consistent with the second digital token, and when the operation is consistent with the level or type of access granted to the executed application program, obtain the data element from at least one of a computing system or an additional portion of the memory that is inaccessible to the executed application program.

\* \* \* \* \*